(12) United States Patent
Yamada et al.

(10) Patent No.: US 8,332,129 B2
(45) Date of Patent: Dec. 11, 2012

(54) INTERNAL COMBUSTION ENGINE EXHAUST GAS SYSTEM AND CONTROL METHOD OF THE SAME

(75) Inventors: Takafumi Yamada, Susono (JP); Hisashi Ohki, Numazu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 597 days.

(21) Appl. No.: 12/528,120

(22) PCT Filed: Feb. 19, 2008

(86) PCT No.: PCT/IB2008/000529
§ 371 (c)(1),
(2), (4) Date: Feb. 24, 2010

(87) PCT Pub. No.: WO2008/102260
PCT Pub. Date: Aug. 28, 2008

(65) Prior Publication Data
US 2010/0211293 A1    Aug. 19, 2010

(30) Foreign Application Priority Data

Feb. 23, 2007  (JP) ................................ 2007-043415

(51) Int. Cl.
*B60T 7/12* (2006.01)
*G05D 1/00* (2006.01)
*G06F 7/00* (2006.01)
*G06F 17/00* (2006.01)
*F02B 47/08* (2006.01)
*F02B 33/44* (2006.01)
*F02M 25/07* (2006.01)
*F01N 3/00* (2006.01)

(52) U.S. Cl. .............. 701/109; 123/568.11; 123/568.21; 60/276; 60/285; 60/605.2; 701/108

(58) Field of Classification Search ............... 60/276, 60/277, 278, 285, 286, 295, 299, 303, 311, 60/600, 605.2; 123/403, 568.12, 568.19, 123/568.21, 698; 701/103, 108, 109, 114
See application file for complete search history.

(56) References Cited

U.S. PATENT DOCUMENTS 5,927,075 A * 7/1999 Khair ........................... 60/605.2
6,230,697 B1 * 5/2001 Itoyama et al. ........... 123/568.21
(Continued)

FOREIGN PATENT DOCUMENTS
EP       1 132 583 A1      9/2001
(Continued)

*Primary Examiner* — Stephen K Cronin
*Assistant Examiner* — Sherman Manley
(74) *Attorney, Agent, or Firm* — Sughrue Mion, PLLC

(57) ABSTRACT

An internal combustion engine exhaust gas system includes a filter arranged in an exhaust passage of the internal combustion engine, a fuel adding valve which is arranged upstream of the filter and supplies fuel into the exhaust passage, and a low-pressure exhaust gas recirculation apparatus that removes some of the exhaust gas from downstream of the filter as EGR gas. An EGR rate is controlled taking into account the amount of fuel supplied by the fuel adding valve such that an oxygen concentration of intake gas, which is drawn into a cylinder of the internal combustion engine in a state in which the EGR gas that is introduced by the low-pressure exhaust gas recirculation apparatus is mixed with air introduced into an intake passage, is constant before and after fuel is supplied by the fuel adding valve.

26 Claims, 12 Drawing Sheets

U.S. PATENT DOCUMENTS

| | | | |
|---|---|---|---|
| 6,338,245 B1 * | 1/2002 | Shimoda et al. | 60/285 |
| 6,742,335 B2 * | 6/2004 | Beck et al. | 60/605.2 |
| 7,107,764 B1 * | 9/2006 | Opris et al. | 60/297 |
| 7,278,411 B1 * | 10/2007 | Fluga et al. | 123/568.12 |
| 7,284,366 B2 * | 10/2007 | Kurtz | 60/277 |
| 7,469,692 B2 * | 12/2008 | Dea et al. | 123/568.21 |
| 7,520,273 B2 * | 4/2009 | Freitag et al. | 123/568.21 |
| 7,591,131 B2 * | 9/2009 | Easley et al. | 60/278 |
| 7,979,196 B2 * | 7/2011 | Dea et al. | 701/108 |
| 8,047,185 B2 * | 11/2011 | Ulrey et al. | 123/568.21 |
| 2007/0068141 A1 * | 3/2007 | Opris et al. | 60/283 |
| 2008/0295486 A1 * | 12/2008 | Crowell et al. | 60/274 |
| 2011/0146268 A1 * | 6/2011 | Hepburn et al. | 60/602 |
| 2012/0144806 A1 * | 6/2012 | Hamamatsu et al. | 60/278 |

FOREIGN PATENT DOCUMENTS

| | | |
|---|---|---|
| JP | 2001-234772 A | 8/2001 |
| JP | 2005-069207 A | 3/2005 |
| JP | 2007-162501 A | 6/2007 |

* cited by examiner

INTERNAL COMBUSTION ENGINE EXHAUST GAS SYSTEM AND CONTROL METHOD OF THE SAME

BACKGROUND OF THE INVENTION

1. Field of the Invention

The invention relates to an exhaust gas system of an internal combustion engine, which is provided with an exhaust gas recirculation (EGR) apparatus which introduces some exhaust gas as EGR gas into an intake passage, as well as to a control method of that exhaust gas system.

2. Description of the Related Art

Widely known examples of an exhaust gas control apparatus that purifies exhaust gas discharged from an internal combustion engine include a filter that purifies exhaust gas by trapping particulates in the exhaust gas, and a $NO_x$ storage-reduction catalyst that purifies exhaust gas by storing nitrogen oxide ($NO_x$) in the exhaust gas and then reducing that stored $NO_x$.

With a filter, when the amount of particulates that the filter traps increases, the filter becomes clogged, which adversely affects the ability of the filter to trap more particulates, i.e., it adversely affects the ability of the filter to purify the exhaust gas. In order to recover that ability, a filter recovery process is performed in which the trapped particulates are burned off by supplying fuel into the exhaust passage and increasing the filter bed temperature. Also, with a $NO_x$ catalyst, as the amount of stored $NO_x$ increases, the exhaust gas purifying ability decreases. Therefore, in order to purify the exhaust gas by reducing the stored $NO_x$, a rich spike process is performed in which fuel is supplied into the exhaust passage to temporarily make the exhaust gas air-fuel ratio rich. As a result, the $NO_x$ catalyst recovers the ability to purify the exhaust gas. Furthermore, with a $NO_x$ catalyst, a sulfur poisoning recovery process in which fuel is supplied to the exhaust passage is also performed to recover the ability to purify the exhaust gas, which has deteriorated due to sulfur poisoning. These processes which supply fuel into the exhaust passage are necessary to restore the ability to purify the exhaust gas to the exhaust gas control apparatus. Also, in order to prevent a fuel adding valve which is provided as a fuel supply device that supplies fuel into the exhaust passage from clogging, fuel is injected into the exhaust passage at predetermined cycles specifically to prevent clogging.

Many internal combustion engines provided with this kind of exhaust gas control apparatus are equipped with an exhaust gas recirculation (EGR) apparatus that removes some of the exhaust gas from the exhaust passage and introduces it as EGR gas into the intake passage in order to lower the combustion temperature so as to reduce the amount of $NO_x$ discharged. Japanese Patent Application Publication No. 2005-069207 (JP-A-2005-069207), for example, describes one exhaust gas system provided with an exhaust gas recirculation apparatus that removes EGR gas from downstream of a filter and introduces it into the intake passage. This system estimates the oxygen concentration downstream of the filter based on a change in the amount of particulates trapped by the filter, and performs control to reduce the flowrate of the EGR gas as the oxygen concentration decreases. Other such technology related to the invention is also described in Japanese Patent Application Publication No. 2001-234772 (JP-A-2001-234772).

With this kind of exhaust gas system, when fuel is supplied into the exhaust passage, the concentration of carbon dioxide in the exhaust gas that passes through the exhaust gas control apparatus such as the filter increases by the oxidation of that fuel or the oxidation of the particulates in the filter. In other words, the oxygen concentration of that exhaust gas decreases. As a result, the carbon dioxide concentration of the EGR gas removed from downstream of the exhaust gas control apparatus increases so the oxygen concentration of the intake gas that is drawn into the cylinder in a state in which that EGR gas is mixed with the air that is introduced into the intake passage changes. This change in the oxygen concentration of the intake gas results in combustion in the internal combustion engine becoming unstable.

SUMMARY OF THE INVENTION

This invention thus provides an internal combustion engine exhaust gas system capable of preventing combustion in the internal combustion engine from becoming unstable before and after fuel is supplied into an exhaust passage while EGR gas is being introduced into an intake passage.

One aspect of the invention relates to an internal combustion engine exhaust gas system that includes an exhaust gas control apparatus which is arranged in an exhaust passage of the internal combustion engine and purifies exhaust gas; a fuel supply device which is arranged upstream of the exhaust gas control apparatus and supplies fuel into the exhaust passage; an exhaust gas recirculation apparatus that removes some of the exhaust gas from downstream of the exhaust gas control apparatus as EGR gas and introduces that removed exhaust gas into an intake passage of the internal combustion engine; and an exhaust gas recirculation control apparatus which, taking into account the amount of fuel supplied by the fuel supply device, controls an EGR rate, which is the percentage of EGR gas in intake gas that is drawn into a cylinder of the internal combustion engine in a state in which the EGR gas introduced by the exhaust gas recirculation apparatus is mixed with air introduced into the intake passage, such that an oxygen concentration of the intake gas is constant before and after fuel is supplied by the fuel supply device.

With the exhaust gas system of this aspect of the invention, even if fuel is supplied into the exhaust passage by the fuel supply device while EGR gas is being introduced by the exhaust gas recirculation apparatus, and as a result, the carbon dioxide in the exhaust gas increases compared to what it was before that fuel is supplied into the exhaust passage, the oxygen concentration of the intake gas that is drawn into the cylinder is kept constant before and after the fuel is supplied by the fuel supply device, which prevents combustion in the internal combustion engine from becoming unstable. Control of the EGR rate can be realized by controlling at least one of the flowrate of the air that is introduced into the intake passage and the flowrate of the EGR gas that is introduced by the exhaust gas recirculation apparatus.

In the exhaust gas system according to this aspect of the invention, the internal combustion engine may be provided with a turbocharger which has a compressor that is arranged in the intake passage and a turbine that is arranged in the exhaust passage in a state integrally rotatable with the compressor, the turbocharger providing a pressure boost by driving the compressor using exhaust gas energy captured by the turbine. Furthermore, the exhaust gas recirculation apparatus may include a low-pressure exhaust gas recirculation apparatus that is arranged such that EGR gas is removed from the exhaust passage at a location downstream of the turbine of the turbocharger and the removed EGR gas is introduced into the intake passage at a location upstream of the compressor of the turbocharger. According to this structure, the EGR gas that is introduced is at a lower temperature than it would be if exhaust gas is removed as EGR gas from upstream of the turbine and introduced downstream of the compressor. Such low temperature EGR gas is introduced taking into account the amount of fuel that is supplied by the fuel supply device, which enables the advantage obtained when applying a low-pressure exhaust gas recirculation apparatus to an internal combustion engine with a turbocharger to be maximized.

The exhaust gas system according to the foregoing aspect of the invention, the exhaust gas control apparatus may include a filter that traps particulates in the exhaust gas, and the exhaust gas recirculation control apparatus may include i) a converting apparatus that converts an oxidation amount of particulates, which is the amount of particulates, trapped in the filter, that are oxidized when the fuel is supplied by the fuel supply device, to an equivalent fuel amount that corresponds to the oxidation amount, and ii) a target air flowrate calculating apparatus that calculates a target air flowrate of air that is introduced into the intake passage, taking into account the equivalent fuel amount that is converted by the converting apparatus. Further, the exhaust gas recirculation control apparatus may control the EGR rate based on the target air flowrate that is calculated by the target air flowrate calculating apparatus. The amount of carbon dioxide produced increases as the amount of particulates that are oxidized following the supply of fuel by the fuel supply device increases. According to this structure, the oxidation amount of the particulates is converted into an equivalent fuel amount that corresponds to that oxidation amount, and the target air flowrate is calculated taking that equivalent fuel amount into account. Accordingly, the target air flowrate is calculated taking into account the carbon dioxide produced by the oxidation of the particulates, thus enabling the EGR rate to be controlled more accurately.

In the exhaust gas system according to the foregoing aspect of the invention, the exhaust gas recirculation control apparatus may be provided with a target air flowrate calculating apparatus that calculates, taking into account the amount of fuel that is supplied by the fuel supply device, a target air flowrate of air that is introduced into the intake passage after fuel is supplied by the fuel supply device assuming that the flowrate of the intake gas is constant before and after the fuel is supplied by the fuel supply device. Further, the exhaust gas recirculation control apparatus may control the EGR rate based on the target air flowrate that is calculated by the target air flowrate calculating apparatus. According to this structure, the state in the cylinder is simplified by assuming that the flowrate of the intake gas that is drawn into the cylinder before and after fuel is supplied by the fuel supply device is constant. As a result, it is easier to estimate the affect of the carbon dioxide that increases following the supply of fuel by the fuel supply device.

With this structure, the target air flowrate calculating apparatus may calculate the target air flowrate based on an expression $$G_{a2} = \frac{G_{cyl1} \times G_{a1} \times (G_{f1} + G_{ad})}{\{(G_{cyl1} - G_{a1}) \times G_{f1} + G_{a1} \times (G_{f1} + G_{ad})\}}$$

where $G_{a2}$ represents the target air flowrate, $G_{a1}$ represents an intake air flowrate before fuel is supplied by the fuel supply device, $G_{cyl1}$ represents a flowrate of the intake gas, $G_{f1}$ represents a quantity of fuel injected into the cylinder, and $G_{ad}$ represents the amount of fuel supplied by the fuel supply device. In this case, the oxygen concentration of the intake gas that is drawn into the cylinder can be made constant before and after the fuel is supplied by the fuel supply device by controlling the EGR rate based on the target air flowrate that is calculated from the foregoing expression. In the foregoing expression, the ratio of the EGR rate to the excess air percent can be derived as the same ratio before and after the supply of fuel. This excess air percent is obtained by dividing the air fuel ratio by the stoichiometric air-fuel ratio.

The exhaust gas system of the foregoing structure may also include an oxygen concentration detecting device which is arranged downstream of the exhaust gas control apparatus and detects an oxygen concentration of the exhaust gas. Further, the exhaust gas recirculation control apparatus may include an air flowrate correcting apparatus that corrects the target air flowrate that is calculated by the target air flowrate calculating apparatus, taking into account the oxygen concentration detected by the oxygen concentration detecting device. According to this structure, the target air flowrate that is calculated by the target air flowrate calculating apparatus is corrected using the oxygen concentration detected by the oxygen concentration detecting device, which improves the accuracy of EGR rate control.

In the exhaust gas system of the foregoing structure, the exhaust gas recirculation control apparatus may synchronize the control of the EGR rate with a time that is delayed from a time at which fuel is supplied by the fuel supply device until a change occurs in a carbon dioxide concentration of the intake gas following the supply of fuel by the fuel supply device. According to this structure, the EGR rate control is executed in sync with the delay time, which improves the accuracy of the control.

In this structure, the fuel supply device may be structured to supply fuel a plurality of times at predetermined intervals of time, and when the predetermined intervals of time are equal to or less than a predetermined reference, the exhaust gas recirculation control apparatus, after the control of the EGR rate has been synchronized with the delayed time related to the last time fuel was supplied, may continue to control the EGR rate until the next time fuel is supplied. The peak of the change in the carbon dioxide concentration becomes less pronounced the shorter the fuel supply intervals are. Accordingly, when the fuel supply intervals are equal to or less than a predetermined reference which is a lower limit value of a range within which the carbon dioxide concentration of the intake gas can be regarded as being substantially constant, it is not necessary to synchronize the EGR rate control with the delayed time each time the fuel is supplied. As a result, EGR rate control can be made more efficient.

In the exhaust gas system according to the foregoing aspect of the invention, the internal combustion engine may be provided with a turbocharger which has a compressor that is arranged in the intake passage and a turbine that is arranged in the exhaust passage in a state integrally rotatable with the compressor, the turbocharger providing a pressure boost by driving the compressor using exhaust gas energy captured by the turbine. Also, the exhaust gas recirculation apparatus may include a low-pressure exhaust gas recirculation apparatus that is arranged such that EGR gas is removed from the exhaust passage at a location downstream of the turbine of the turbocharger and the removed EGR gas is introduced into the intake passage at a location upstream of the compressor of the turbocharger, and a high-pressure exhaust gas recirculation apparatus that is arranged such that EGR gas is removed from the exhaust passage at a location upstream of the turbine of the turbocharger and the removed EGR gas is introduced into the intake passage at a location downstream of the compressor of the turbocharger. Also, a mode switching apparatus may be further provided which switches, according to an operating state of the internal combustion engine, an introduction mode of EGR gas among a low pressure mode in which EGR gas is introduced into the intake passage using only the low-pressure exhaust gas recirculation apparatus, a high pressure mode in which EGR gas is introduced into the intake passage using only the high-pressure exhaust gas recirculation apparatus, and a middle mode in which EGR gas is introduced into the intake passage using both the low-pressure exhaust gas recirculation apparatus and the high-pressure exhaust gas recirculation apparatus. In this case, it is possible to use the low pressure mode, the high pressure mode, and the middle mode as appropriate according to the operating state of the internal combustion engine.

For example, the exhaust gas system of this structure may also be provided with an air flowrate detecting device that detects an air flowrate of air that is introduced into the intake passage. Further, the exhaust gas recirculation control apparatus may include i) a target air flowrate calculating apparatus that calculates a target air flowrate of air that is introduced into the intake passage, taking into account the amount of fuel supplied by the fuel supply device, ii) a low-pressure exhaust gas recirculation control apparatus that operates the low-pressure exhaust gas recirculation apparatus according to a change rate of the target air flowrate before and after fuel is supplied by the fuel supply device when the introduction mode has been switched to the middle mode by the mode switching apparatus, and iii) a high-pressure exhaust gas recirculation feedback control apparatus that feedback controls a gas flowrate of the EGR gas that is introduced by the high-pressure exhaust gas recirculation apparatus by operating the high-pressure exhaust gas recirculation apparatus, such that a difference between the target air flowrate calculated by the target air flowrate calculating apparatus and the air flowrate detected by the air flowrate detecting device decreases. According to this structure, in the middle mode, the low-pressure exhaust gas recirculation apparatus is operated according to the change rate of the target air flowrate so the difference between the target air flowrate calculated by the target air flowrate calculating apparatus and the air flowrate detected by the air flowrate detecting device is reduced. That is, the current air flowrate is brought closer to the target air flowrate by operating the low-pressure exhaust gas recirculation apparatus. Then the high-pressure exhaust gas recirculation apparatus is feedback controlled to reduce that difference. The path from which the EGR gas of the high-pressure exhaust gas recirculation apparatus is introduced is shorter than the path from which the EGR gas of the low-pressure exhaust gas recirculation apparatus is introduced so the response of the high-pressure exhaust gas recirculation apparatus is better than that of the low-pressure exhaust gas recirculation apparatus. Accordingly, the current air flowrate can be quickly brought to the target air flowrate by operating the high-pressure exhaust gas recirculation apparatus while operating the low-pressure exhaust gas recirculation apparatus, as is done here.

For example, the exhaust gas system of the foregoing structure may also be provided with a target air flowrate calculating apparatus that calculates a target air flowrate of air that is introduced into the intake passage; an air flowrate detecting device that detects an air flowrate of the air that is introduced into the intake passage; a high-pressure exhaust gas recirculation feedback control apparatus that feedback controls a gas flowrate of the EGR gas that is introduced by the high-pressure exhaust gas recirculation apparatus, such that a difference between the target air flowrate calculated by the target air flowrate calculating apparatus and the air flowrate detected by the air flowrate detecting device decreases; and a feedback control prohibiting apparatus that prohibits the feedback control by the high-pressure exhaust gas recirculation feedback control apparatus such that the gas flowrate of the EGR gas that is introduced by the high-pressure exhaust gas recirculation apparatus will not decrease, when the introduction mode has been switched to the middle mode by the mode switching apparatus and fuel is supplied by the fuel supply device. Moreover, the target air flowrate calculating apparatus may calculate the target air flowrate taking into account the amount of fuel that is supplied by the fuel supply device when fuel is supplied by the fuel supply device, and the exhaust gas recirculation control apparatus may control the EGR rate based on the target air flowrate that is calculated by the target air flowrate calculating apparatus. The high-pressure exhaust gas recirculation feedback control apparatus feedback controls the gas flowrate of the EGR gas to reduce the difference between the target air flowrate and the actual air flowrate detected by the air flowrate detecting device so transient response in the middle mode is ensured. However, if such feedback control is performed when fuel is supplied by the fuel supply device in the middle mode, the target air flowrate that is calculated by the target air flowrate calculating apparatus taking into account the amount of fuel that is supplied by the fuel supply device will increase. In association with this, the gas flowrate of the EGR gas that is introduced by the high-pressure exhaust gas recirculation apparatus is controlled so that it decreases, which results in a drop in the intake air temperature as well as the exhaust gas temperature. To compensate for these drops, the amount of fuel supplied by the fuel supply device must be increased. According to this structure, when fuel is supplied by the fuel supply device in the middle mode, feedback control by the high-pressure exhaust gas recirculation feedback control apparatus is prohibited so that the gas flowrate of the EGR gas that is introduced by the high-pressure exhaust gas recirculation apparatus will not decrease. Accordingly, a change in the gas flowrate of the EGR gas that is introduced by the high-pressure exhaust gas recirculation apparatus is able to be suppressed. As a result, there is no need to increase the amount of fuel that is supplied by the fuel supply device, which enables a reduction in fuel efficiency to be suppressed.

In the exhaust gas system of the foregoing structure, the exhaust gas recirculation control apparatus may control the EGR rate such that the oxygen concentration of the intake gas that is drawn into the cylinder of the internal combustion engine is constant before and after fuel is supplied by the fuel supply device, on a condition that a predetermined period of time has elapsed after the EGR gas that is introduced by the low-pressure exhaust gas recirculation apparatus has reached the cylinder of the internal combustion engine, after the introduction mode of the EGR gas has been switched from the high pressure mode to the low pressure mode by the mode switching apparatus. Because the EGR gas that is introduced by the low-pressure exhaust gas recirculation apparatus contains a large amount of air when the introduction mode is first switched from the high pressure mode to the low pressure mode, if the EGR rate control described above is performed immediately after the switch, the air-fuel ratio of the intake gas that is drawn into the cylinder may become lean, which would increase the amount of nitrogen oxide that is discharged. According to this structure, EGR rate control is performed on the condition that a predetermined period of time has elapsed after the EGR gas that is introduced by the low-pressure exhaust gas recirculation apparatus has reached the cylinder of the internal combustion engine, thereby preventing such an increase in the amount of nitrogen oxide that is discharged.

Another aspect of the invention relates to a control method of an internal combustion engine exhaust gas system that includes an exhaust gas control apparatus which is arranged in an exhaust passage of the internal combustion engine and purifies exhaust gas, a fuel supply device which is arranged upstream of the exhaust gas control apparatus and supplies fuel into the exhaust passage, and an exhaust gas recirculation apparatus that removes some of the exhaust gas from downstream of the exhaust gas control apparatus as EGR gas and introduces that removed exhaust gas into an intake passage of the internal combustion engine. This control method includes controlling an EGR rate, which is the percentage of EGR gas in intake gas that is drawn into a cylinder of the internal combustion engine in a state in which the EGR gas introduced by the exhaust gas recirculation apparatus is mixed with air introduced into the intake passage, taking into account the amount of fuel supplied by the fuel supply device, such that an oxygen concentration of the intake gas is constant before and after fuel is supplied by the fuel supply device.

As described above, according to the foregoing aspects of the invention, even if fuel is supplied into the exhaust passage by the fuel supply device while EGR gas is being introduced by the exhaust gas recirculation apparatus, and as a result, the carbon dioxide in the exhaust gas increases compared to what it was before that fuel was supplied into the exhaust passage, the oxygen concentration of the intake gas that is drawn into the cylinder is kept constant before and after the fuel is supplied by the fuel supply device, which prevents combustion in the internal combustion engine from becoming unstable.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

First Example Embodiment

Figure 1:
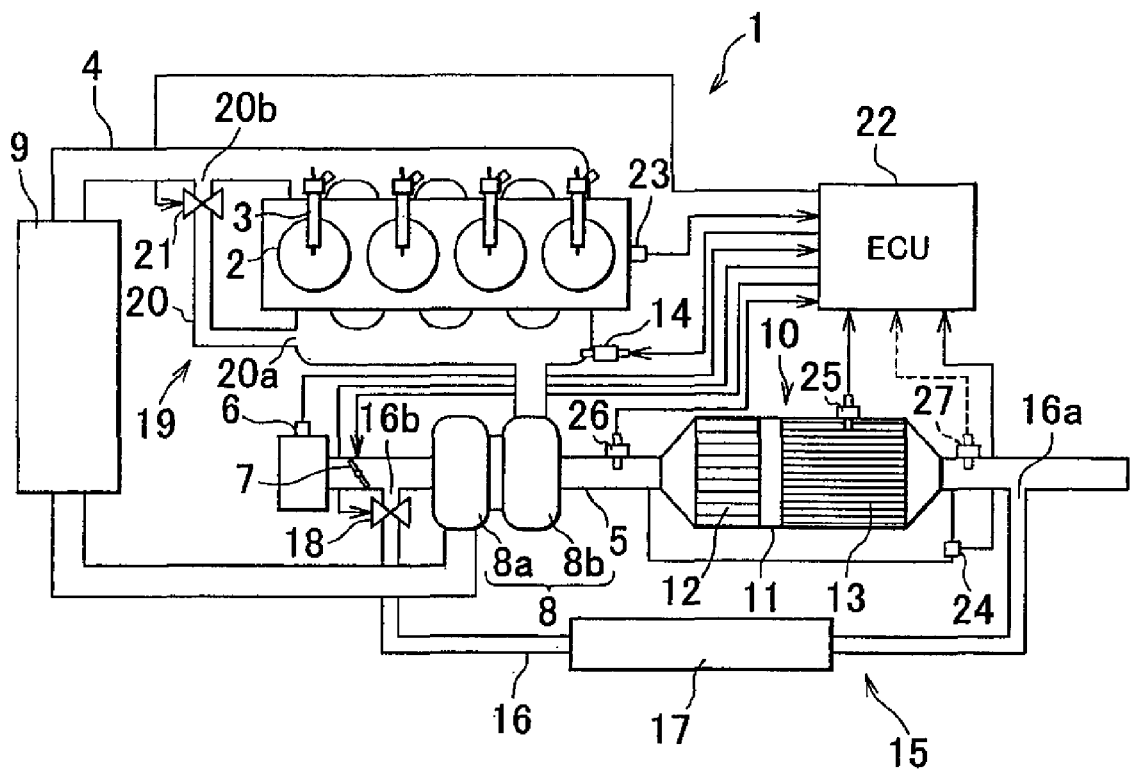
FIG. 1 is a diagram of the main portions of an internal combustion engine to which an exhaust gas system according to one example embodiment of the invention has been applied.

FIG. 1 is a diagram of the main portions of an internal combustion engine to which an exhaust gas system according to one example embodiment of the invention has been applied. The internal combustion engine 1 is configured as an inline four cylinder diesel engine in which four cylinders 2 are in a straight row, and is mounted in a vehicle, not shown, as a power source for running. Each cylinder 2 has one fuel injection valve 3 and is connected to an intake passage 4 and an exhaust passage 5. In the intake passage 4 are provided an airflow meter 6 which serves as an air flowrate detecting device that detects the air flowrate, a throttle valve 7, a compressor 8a of a turbocharger 8, and an intercooler 9 that cools compressed air. Meanwhile, in the exhaust passage 5 are provided a turbine 8b of the turbocharger 8, and an exhaust gas control apparatus 10. The turbocharger 8 is a well-known variable capacity turbocharger that has a variable nozzle, not shown, provided on the turbine 8b side. Although a detailed description will be omitted, the turbocharger 8 is able to appropriately adjust the boost pressure by changing the opening amount of the variable nozzle according to the operating state of the internal combustion engine 1.

The exhaust gas control apparatus 10 includes a casing 11 that forms part of the exhaust passage 5, and an oxidation catalyst 12 and a filter 13 that are housed in that casing 11. The filter 13 has a porous substrate, not shown, that is able to trap particulates in the exhaust gas. As a result, the exhaust gas control apparatus 10 serves to purify the exhaust gas by trapping the particulates with the filter 13. When the amount of trapped particulates reaches the limit, the filter 13 becomes clogged, and as a result, the exhaust gas control apparatus 10 looses the ability to purify the exhaust gas. Therefore, a fuel adding valve 14 is provided as a fuel supply device that injects fuel into the exhaust passage to restore the ability to purify exhaust gas to the exhaust gas control apparatus 10 before that limit is reached. The fuel adding valve 14 is arranged upstream of both the exhaust gas control apparatus 10 and the turbine 8b of the turbocharger 8. When fuel is supplied into the exhaust passage 5 by being injected from the fuel adding valve 14, the oxidation catalyst 12 generates heat which raises the bed temperature of the filter 13. As a result, the particulates trapped by the filter 13 are oxidized (i.e., burned off), thereby restoring the ability of the exhaust gas control apparatus 10 to purify the exhaust gas. This kind of operation is well-known and referred to as a filter recovery process. Also, the fuel adding valve 14 is arranged so that it is exposed to the inside of the exhaust passage 5 and, as a result, will become clogged if fuel is not injected for an extended period of time.

Therefore, a clogging prevention process is performed in which fuel is injected from the fuel adding valve 14 at predetermined cycles.

As shown in FIG. 1, the internal combustion engine 1 is provided with a low-pressure exhaust gas recirculation (in this specification, "exhaust gas recirculation" may also be referred to simply as "EGR") apparatus 15 and a high-pressure EGR apparatus 19, which together make up the exhaust gas recirculation (EGR) apparatus, to remove some of the exhaust gas from the exhaust passage 5 as EGR gas and introduce it into the intake passage 4. The low-pressure EGR apparatus 15 includes a low-pressure EGR passage 16 that connects the exhaust passage 5 to the intake passage 4, a cooling apparatus 17 that cools the EGR gas that passes through the low-pressure EGR passage 16, and a low-pressure EGR valve 18 that adjusts the flowrate of the EGR gas flowing through the low-pressure EGR passage 16 by changing its opening amount. The position where the low-pressure EGR passage 16 connects with the exhaust passage 5, i.e., the EGR gas removal point 16*a*, is downstream of the exhaust gas control apparatus 10, and the position where the low-pressure EGR passage 16 connects with the intake passage 4, i.e., the EGR gas introduction point 16*b*, is downstream of the throttle valve 7 and upstream of the compressor 8*a* of the turbocharger 8. Accordingly, the low-pressure EGR apparatus 15 removes EGR gas from downstream of both the exhaust gas control apparatus 10 and the fuel adding valve 14, and introduces that EGR gas upstream of the compressor 8*a*. The low-pressure EGR apparatus 15 which recirculates exhaust gas along this kind of path is known as a low-pressure loop EGR apparatus.

Meanwhile, the high-pressure EGR apparatus 19 includes a high-pressure EGR passage 20 that connects the exhaust passage 5 to the intake passage 4, and a high-pressure EGR valve 21 that adjusts the flowrate of the EGR gas that flows through the high-pressure EGR passage 20 by changing its opening amount. Incidentally, similar to the low-pressure EGR apparatus 15, the high-pressure EGR apparatus 19 may also have a cooling apparatus that cools the EGR gas provided in the high-pressure EGR passage 20. The position where the high-pressure EGR passage 20 connects with the exhaust passage 5, i.e., the EGR gas removal point 20*a*, is upstream of both the turbine 8*b* of the turbocharger 8 and the fuel adding valve 14, and the position where the high-pressure EGR passage 20 connects with the intake passage 4, i.e., the EGR gas introduction point 20*b*, is downstream of the compressor 8*a* of the turbocharger 8. Accordingly, the high-pressure EGR apparatus 19 removes EGR gas from upstream of the fuel adding valve 14, and introduces that EGR gas downstream of the compressor 8*a*. As a result, fuel supplied by the fuel adding valve 14 will not make its way around to the intake passage 4. The high-pressure EGR apparatus 19 which recirculates exhaust gas along this kind of path is known as a high-pressure loop EGR apparatus.

Operation of the fuel adding valve 14, the low-pressure EGR apparatus 15, and the high-pressure EGR apparatus 19 is all controlled by an engine control unit (ECU) 22 which is a computer that is provided for appropriately controlling the internal combustion engine 1. The ECU 22 is made up of a microprocessor and storage devices such as ROM and RAM that are necessary for its operation. As well as receiving a signal from the airflow meter 6, the ECU 22 also receives a signal from a rotation speed sensor 23 that detects the speed (i.e., rotation speed) of the internal combustion engine 1, a signal from a differential pressure sensor 24 that detects the differential pressure between upstream and downstream of the exhaust gas control apparatus 10, a signal from a bed temperature sensor 25 that detects the temperature (i.e., bed temperature) of the filter 13, and a signal from an exhaust gas temperature sensor 26 that detects the exhaust gas temperature downstream of the turbine 8*b*. The ECU 22 also receives other signals such as a signal relating to the opening amount of the throttle valve 7, a signal relating to the opening amount of the low-pressure EGR valve 18, and a signal relating to the opening amount of the high-pressure EGR valve 21. The ECU 22 then controls various parameters, such as the injection amount and timing of fuel supplied to each cylinder 2 of the internal combustion engine 1, according to various programs stored in the storage devices while referring to those various signals. The control executed by the ECU 22 is broad but here mainly the control related to the invention will be described.

Figure 2:
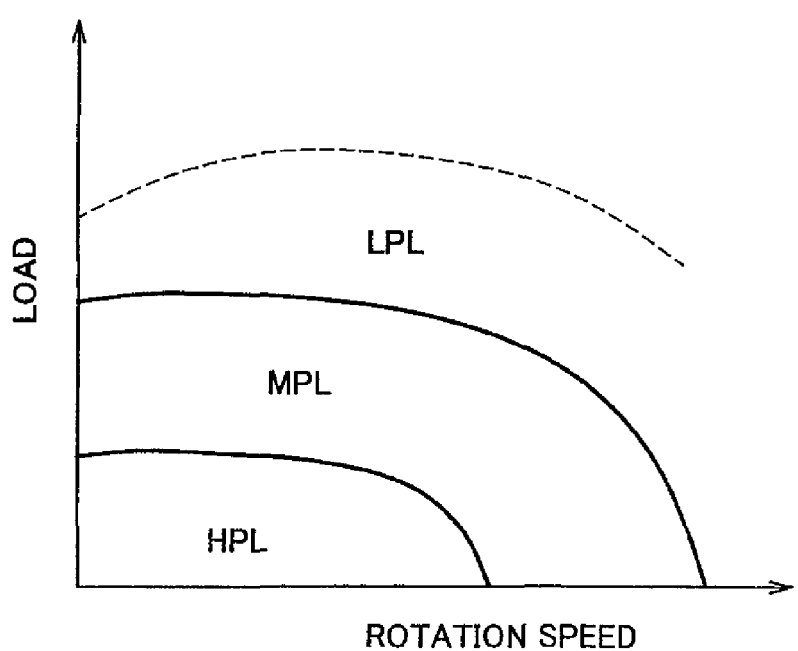
FIG. 2 is a schematic diagram of one example of a mode selection map in which a plurality of various modes for introducing EGR gas are correlated with the operating state of the internal combustion engine.

The determination as to whether to introduce EGR gas into the intake passage 4 (i.e., whether to execute or prohibit the execution of EGR) is determined according to the operating state of the internal combustion engine 1. FIG. 2 is a schematic diagram of an example of an introduction mode selection map in which a plurality of various introduction modes for introducing EGR gas are correlated with the operating state of the internal combustion engine 1. As shown in the drawing, when EGR gas is introduced, the ECU 22 selects the appropriate introduction mode from among three modes, i.e., an LPL mode, an HPL mode, and an MPL mode, and switches among them according to the operating state, in this case, the speed and load, of the internal combustion engine 1. The LPL mode is a low-pressure mode that introduces EGR gas using only the low-pressure EGR apparatus 15. The HPL mode is a high-pressure mode that introduces EGR gas using only the high-pressure EGR apparatus 19. The MPL mode is a middle mode that introduces EGR gas using both of the EGR apparatuses 15 and 19. According to this operation, the ECU 22 functions as a mode switching apparatus of the invention.

Regardless of which mode is being switched into, the ECU 22 controls the EGR rate by operating the low-pressure EGR apparatus 15 and the high-pressure EGR apparatus 19 while controlling the opening amount of the throttle valve 7. As is well known, the EGR rate is defined as the percentage of EGR gas in the intake gas that is drawn into the cylinders 2.

When fuel is supplied into the exhaust passage 5 by the fuel adding valve 14 while EGR gas is being introduced, carbon dioxide is produced by the fuel oxidizing on the oxidation catalyst 12 housed in the exhaust gas control apparatus 10, as well as by the particulates that are trapped in the filter 13 oxidizing. When in the LPL mode or the MPL mode where EGR gas is introduced using the low-pressure EGR apparatus 15 in which the EGR gas removal point 16*a* is downstream of the exhaust gas control apparatus 10, the EGR gas that is introduced into the intake passage 4 contains more carbon dioxide than it did before the fuel was supplied by the fuel adding valve 14. Therefore, when the EGR rate and the intake air flowrate before and after the fuel is supplied by the fuel adding valve 14 is kept constant, the oxygen concentration of the intake gas that is drawn into the cylinders 2 is different after the fuel is supplied than it is before the fuel is supplied because the carbon dioxide in the EGR gas has increased. That change in the oxygen concentration of the intake gas causes combustion to become unstable.

Therefore, the ECU 22 of this example embodiment controls the EGR rate taking into account the amount of fuel that is supplied by the fuel adding valve 14 so that the oxygen concentration of the intake gas is constant (i.e., the same) before and after fuel is supplied by the fuel adding valve 14. The ECU 22 calculates a target value for the flowrate of the air that is introduced into the intake passage 4 (i.e., a target air flowrate), and controls the EGR rate based on the calculated target value. This EGR rate control is realized by controlling the opening amounts of the throttle valve 7, the low-pressure EGR valve 18, and the high-pressure EGR valve 21 with the ECU 22.

Figure 3:
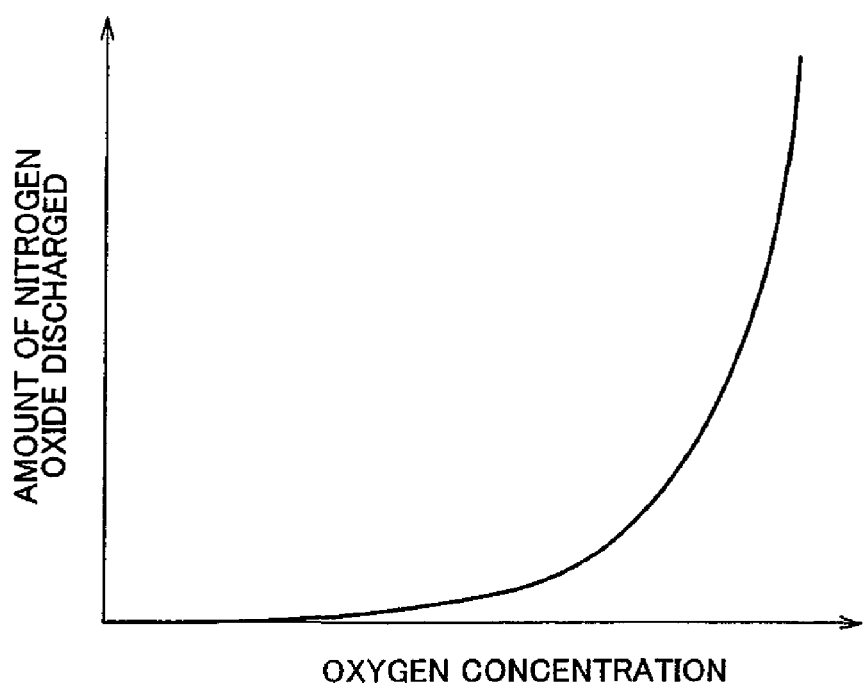
FIG. 3 is a graph showing the relationship between the oxygen concentration of the intake gas and the amount of nitrogen oxide that is discharged.
Figure 4:
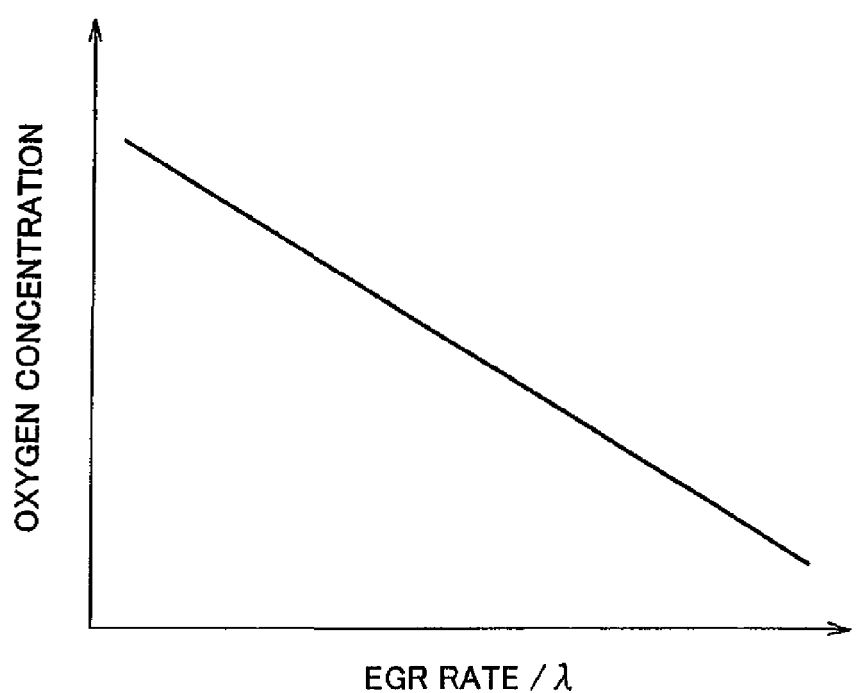
FIG. 4 is a graph showing the relationship between the ratio of the EGR rate to the excess air percent (i.e., EGR rate/λ) and the oxygen concentration of the intake gas.

First, the basis for calculating the target air flowrate used in the EGR rate control will be described. FIG. 3 is a graph showing the relationship between the oxygen concentration of the intake gas and the amount of nitrogen oxide that is discharged. FIG. 4 is a graph showing the relationship between the ratio of the EGR rate to the excess air percent (i.e., EGR rate/λ) and the oxygen concentration of the intake gas. As shown in FIG. 3, in the relationship between the oxygen concentration of the intake gas and the amount of nitrogen oxide that is discharged, the amount of nitrogen oxide discharged tends to increase as the oxygen concentration rises. Also, as shown in FIG. 4, in the relationship between the EGR rate/λ and the oxygen concentration of the intake gas, the oxygen concentration tends to decrease as the EGR rate/λ increases. That is, EGR rate/λ is a physical quantity that correlates with the oxygen concentration. Therefore, the oxygen concentration of the intake gas can be kept constant by keeping the EGR rate/λ constant before and after fuel is supplied by the fuel adding valve 14. Keeping the oxygen concentration constant stabilizes combustion as well as results in a constant amount of nitrogen oxide being discharged. Incidentally, the excess air percent λ is defined as: λ=air-fuel ratio/stoichiometric air-fuel ratio (=14.7).

In this example embodiment, the target air flowrate is calculated from the operating state of the internal combustion engine 1 before fuel is supplied by the fuel adding valve 14, according to Expression 1 below. The EGR rate is then controlled so that the air flowrate after that fuel is supplied comes to match the target air flowrate $G_{a2}$ that is calculated by Expression 1. As a result, the oxygen concentration of the intake gas becomes constant before and after fuel is supplied by the fuel adding valve 14.

$$G_{a2} = \frac{G_{cyl1} \times G_{a1} \times (G_{f1} + G_{ad})}{\{(G_{cyl1} - G_{a1}) \times G_{f1} + G_{a1} \times (G_{f1} + G_{ad})\}} \quad 1$$

In this expression, $G_{a1}$ represents the intake air flowrate before the fuel is supplied, $G_{cyl1}$ represents the flowrate of the intake gas, $G_{f1}$ represents the quantity of fuel injected into the cylinders 2, and $G_{ad}$ represents the amount of fuel supplied by the fuel adding valve 14.

Expression 1 is calculated according to the following process. Incidentally, in the following description, the suffix "1" is attached to letters indicating various physical quantities before fuel is injected by the fuel adding valve 14, and the suffix "2" is attached to letters indicating various physical quantities after fuel has been supplied by the fuel adding valve 14. First, the EGR rate/λ before fuel is supplied is calculated according to Expression 2 and the EGR rate/λ after fuel is supplied is calculated according to Expression 3.

$$\frac{E_{EGR1}}{\lambda_1} = \frac{G_{EGR1}}{G_{a1} + G_{EGR1}} \times \frac{G_{f1} \times 14.7}{G_{a1}} = \frac{G_{EGR1}}{G_{cyl1}} \times \frac{G_{f1} \times 14.7}{G_{a1}} \quad 2$$

$$\frac{E_{EGR2}}{\lambda_2} = \frac{G_{EGR2}}{G_{a2} + G_{EGR2}} \times \frac{G_{f2} \times 14.7}{G_{a2}} = \frac{G_{EGR2}}{G_{cyl2}} \times \frac{G_{f2} \times 14.7}{G_{a2}} \quad 3$$

In the foregoing expressions, $E_{EGR}$ represents the EGR rate and $G_{EGR}$ represents the flowrate of the EGR gas.

In order to control the oxygen concentration so that it is the same before and after the fuel is supplied by the fuel adding valve 14, Expressions 2 and 3 are made equal. Thus, Expression 4 below can be obtained from Expressions 2 and 3.

$$\frac{G_{EGR1}}{G_{cyl1}} \times \frac{G_{f1} \times 14.7}{G_{a1}} = \frac{G_{EGR2}}{G_{cyl2}} \times \frac{G_{f2} \times 14.7}{G_{a2}} \quad 4$$

Moreover, when the flowrate $G_{cyl1}$ of the intake gas before and after the fuel is supplied by the fuel adding valve 14 is regarded as not changing and $G_{cyl1}=G_{cyl2}$ is substituted into Expression 4, Expression 5 can be obtained from Expression 4.

$$G_{EGR1} \times \frac{G_{f1}}{G_{a1}} = G_{EGR2} \times \frac{G_{f2}}{G_{a2}} \quad 5$$

Among $G_{EGR}$, $G_{cyl}$, and $G_a$, $G_{EGR}=G_{cyl}-G_a$. Therefore, when this is substituted into Expression 5, Expression 6 is obtained.

$$\frac{(G_{cyl1} - G_{a1}) \times G_{f1}}{G_{a1}} = \frac{(G_{cyl1} - G_{a2}) \times G_{f2}}{G_{a2}} \quad 6$$

When Expression 6 is solved with respect to $G_{a2}$, Expression 7 is obtained.

$$G_{a2} = \frac{G_{cyl1} \times G_{f2} \times G_{a1}}{\{(G_{cyl1} - G_{a1}) \times G_{f1} + G_{f2} \times G_{a1}\}} \quad 7$$

In the foregoing expressions, $G_{f2}$ can be regarded as the sum of the fuel injection quantity $G_{f1}$ into the cylinders 2 and the fuel supply amount $G_{ad}$, so Expression 8 is satisfied. When this is substituted into Expression 7, it leads back to Expression 1.

$$G_{f2}=G_{f1}+G_{ad} \quad 8$$

The fuel supply amount $G_{ad}$ is a value that is calculated according to the purpose for which fuel is supplied by the fuel adding valve 14, and is calculated by various control routines related to the foregoing filter recovery process and the clogging prevention process. For example, with the filter recovery process, when the flowrate of the exhaust gas that passes through the exhaust gas control apparatus 10 is represented by $G_{cat}$, the exhaust gas temperature is represented by et, and the target bed temperature of the filter 13 during filter recovery is represented by ethctrg, the fuel supply amount $G_{ad}$ is calculated according to Expression 9. Incidentally, $C_P$ in Expression 9 represents the specific heat, and Hu represents the heating value.

$$G_{ad} = \frac{C_P \times G_{cat}}{Hu} \times (ethcirg - et) \quad 9$$

The flowrate $G_{cat}$ of the exhaust gas that passes through the exhaust gas control apparatus 10 can be calculated from the following relational expression that is satisfied according to the EGR gas introduction mode. Incidentally, $G_{HPL}$ in (3)

represents the flowrate of the EGR gas that passes through the high-pressure EGR passage 20.

Figure 5:
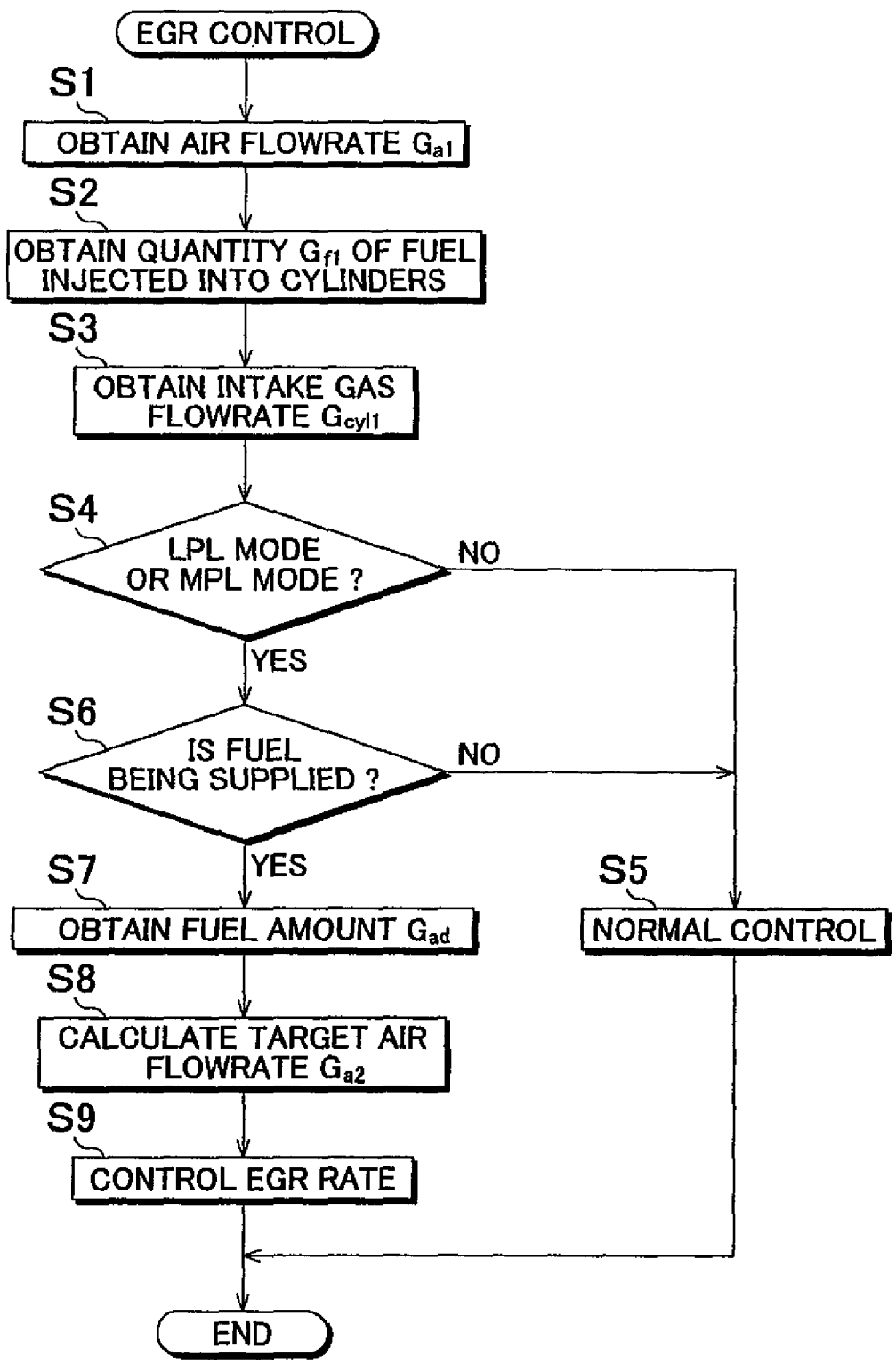
FIG. 5 is a flowchart illustrating an example of a control routine in exhaust gas recirculation (EGR) control according to the first example embodiment.

(1) LPL mode: $G_{cat} = G_{cyl}$
(2) HPL mode: $G_{cat} = G_a$
(3) MPL mode: $G_{cat} = G_{cyl} - G_{HPL}$ FIG. 5 is a flowchart illustrating an example of a control routine of EGR control. The program of this control routine is repeatedly executed at predetermined operation cycles. As shown in FIG. 5, in step S1, the ECU 22 obtains the air flowrate $G_{a1}$ based on the signal output from the airflow meter 6. Next, in step S2, the ECU 22 obtains the fuel injection quantity $G_{fi}$ that is to be injected into the cylinders 2. The fuel injection quantity $G_{fi}$ is a value that is calculated according to a fuel injection control routine, not shown, which is executed in parallel with the routine shown in FIG. 5.

Next, in step S3, the ECU 22 obtains the intake gas flowrate $G_{cyl}$. The intake gas flowrate $G_{cyl1}$ can be obtained by obtaining the flowrate of the EGR gas and then adding the air flowrate $G_{a1}$ to that flowrate. The EGR gas flowrate can be directly measured by providing a detecting device such as a flowrate sensor in both the low-pressure EGR passage 16 and the high-pressure EGR passage 20, or it can be estimated based on the opening amounts of the low-pressure EGR valve 18, the high-pressure EGR valve 21, and the throttle valve 6, and the speed of the internal combustion engine 1.

Next, in step S4, the ECU 22 determines whether the current EGR gas introduction mode is the LPL mode or the MPL mode. This is because if the LPL mode or the MPL mode is selected, fuel supplied by the fuel adding valve 14 may affect combustion. If the HPL mode is selected, however, this will not happen because the EGR gas is removed from upstream of the fuel adding valve 14. Therefore, the process proceeds on to step S5 where normal control is executed, after which this cycle of the routine ends. In normal control, the ECU 22 calculates the target air flowrate and the EGR rate according to the operating state of the internal combustion engine 1, and controls the opening amounts of the low-pressure EGR valve 18, the high-pressure EGR valve 21, and the throttle valve 7 so that the calculated target air flowrate and EGR rate are obtained. In normal control, the ECU 22 stores the calculated target air flowrate.

Then in step S6, the ECU 22 determines whether fuel is being supplied by the fuel adding valve 14 to recover the filter or prevent clogging. If fuel is not being supplied, it is not necessary to take the influence of the supplied fuel on combustion into account so the process proceeds on to step S5 where normal control is executed, after which this cycle of the routine ends.

Next, in step S7, the ECU 22 obtains the fuel amount $G_{ad}$ supplied by the fuel adding valve 14. This fuel amount is calculated according to the purpose for which the fuel is supplied. For example, when fuel is supplied to recover the filter, the fuel amount can be calculated based on Expression 9 above, in which case the exhaust gas temperature et is obtained based on the signal from the exhaust gas temperature sensor 26. Next, in step S8, the ECU 22 calculates the target air flowrate $G_{a2}$ based on Expression 1 above. Then in step S9, the ECU 22 controls the EGR rate based on that calculated target air flowrate $G_{a2}$, after which this cycle of the routine ends. The EGR rate control is executed by the ECU 22 controlling the opening amounts of the low-pressure EGR valve 18, the high-pressure EGR valve 21, and the throttle valve 7.

According to the foregoing example embodiment, even if fuel is supplied into the exhaust passage 5 by the fuel adding valve 14 while EGR gas is being introduced, and as a result, the carbon dioxide in the exhaust gas increases as compared to what it is before that fuel is supplied into the exhaust passage 5, the oxygen concentration of the intake gas that is drawn into the cylinders 2 is kept constant before and after the fuel is supplied by the fuel adding valve 14, which prevents combustion in the internal combustion engine 1 from becoming unstable. Also, by providing the low-pressure EGR apparatus 15 and the high-pressure EGR apparatus 19 and enabling the EGR gas introduction mode to be switched, it is possible to use any one of the LPL mode which uses only the low-pressure EGR apparatus 15, the HPL mode which uses only the high-pressure EGR apparatus 19, or the MPL mode which uses both of the EGR apparatuses 15 and 19, depending on the operating state of the internal combustion engine 1. More specifically, when the LPL mode is selected, EGR gas of a lower temperature than that according to the HPL mode can be introduced. Therefore, for example, when fuel has been supplied by the fuel adding valve 14, instead of switching from the LPL mode to the HPL mode, the advantages of the LPL mode can be maximized.

In the first example embodiment, the ECU 22 functions both as an EGR control apparatus according to the invention by executing the control routine in FIG. 5, and as a target air flowrate calculating apparatus according to the invention by executing step S8 in FIG. 5.

Second Example Embodiment

Figure 6:
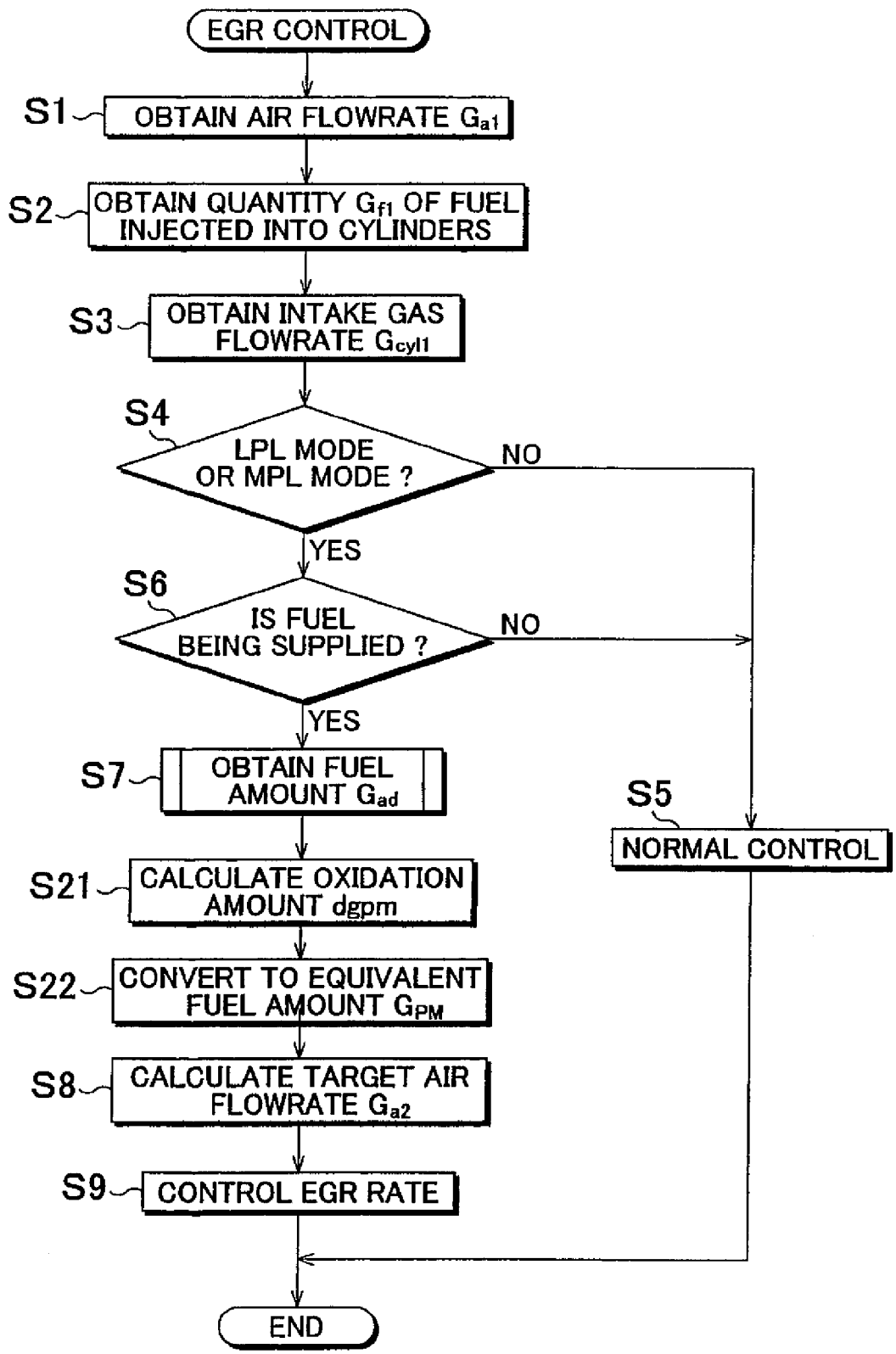
FIG. 6 is a flowchart illustrating an example of a control routine in exhaust gas recirculation (EGR) control according to a second example embodiment of the invention.
Figure 7:
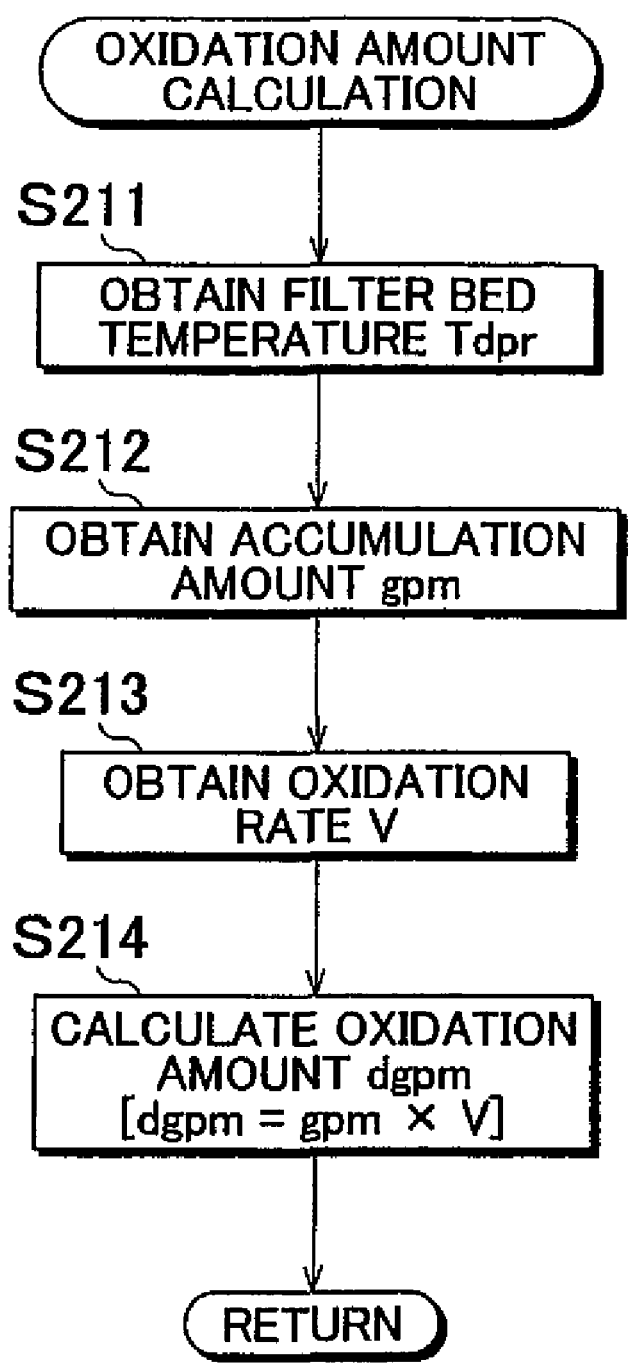
FIG. 7 is a flowchart illustrating the details of an oxidation amount calculation step shown in FIG. 6.

Next, a second example embodiment of the invention will be described with reference to FIGS. 6 and 7. Except for the EGR control; this second example embodiment is the same as the first example embodiment. Thus, a description of those parts of the second example embodiment that are the same as the parts of the first example embodiment will be omitted below. FIG. 6 is a flowchart illustrating an example of a control routine for EGR control according to the second example embodiment, and FIG. 7 is a flowchart illustrating the details of the oxidation amount calculating step in FIG. 6. Incidentally, in FIG. 6, steps that are the same as steps in FIG. 5 of the first example embodiment will be denoted by the same step numbers and descriptions of those steps will be omitted, thus simplifying the description.

As shown in FIG. 6, after calculating the fuel amount $G_{ad}$ in step S7, the ECU 22 calculates an oxidation amount dgpm of the particulates trapped in the filter in step S21. As shown in FIG. 7, the ECU 22 first obtains the temperature (i.e., bed temperature) Tdpr of the filter 13 in step S211. In this example embodiment, the bed temperature of the filter 13 is obtained based on the signal from the bed temperature sensor 25, but it may also be estimated from a physical quantity that correlates with the bed temperature of the filter 13. Next, in step S212, the ECU 22 obtains the amount, i.e., the accumulation amount gpm, of particulates that are trapped in the filter 13. The accumulation amount gpm can be obtained by estimation from the differential pressure between upstream and downstream of the exhaust gas control apparatus 10, for example. This differential pressure is obtained based on the signal from the differential pressure sensor 24. Next, in step S213, the ECU 22 obtains an oxidation rate V of the particulates. The oxidation rate V is a physical quantity that relies on the bed temperature Tdpr of the filter 13. Therefore, a map with the relationship between the bed temperature Tdpr and the oxidation rate V can be stored in the ECU 22 in advance, and the ECU 22 can obtain the oxidation rate V based on the current bed temperature Tdpr by referencing that map. Next, in step S214, the ECU 22 calculates the oxidation amount dgpm. The oxidation amount dgpm can be calculated by multiplying the oxidation rate V by the accumulation amount gpm, i.e., dgpm=gpm×V.

Returning now to FIG. 6, in step S22, the ECU 22 converts the oxidation amount dgpm that is calculated in step S21 to an equivalent fuel amount $G_{PM}$ which is a fuel amount that corresponds to that oxidation amount dgpm. Assuming that carbon dioxide of an amount equal to the carbon dioxide that is produced by the oxidation of the particulates is produced by the oxidation of the fuel supplied by the fuel adding valve 14, the equivalent fuel amount $G_{PM}$ refers to the fuel amount of that supplied fuel. The equivalent fuel amount $G_{PM}$ is converted from the oxidation amount dgpm based on Expression 10 below.

$$G_{PM} = dgpm \times K \qquad 10$$

In this expression, K is a constant that is determined by the fuel supplied by the fuel adding valve 14.

Next, in step S8, the ECU 22 calculates the target air flowrate $G_{a2}$ based on Expression 11 below taking the equivalent fuel amount $G_{PM}$ obtained in step S22 into account.

$$G_{a2} = \frac{G_{cyl1} \times G_{a1} \times (G_{f1} + G_{ad})}{\{(G_{cyl1} - G_{a1}) \times G_{f1} + G_{a1} \times (G_{f1} + G_{ad} + G_{PM})\}} \qquad 11$$

According to this example embodiment, the oxidation amount of the particulates is converted to an equivalent fuel amount that corresponds to that oxidation amount, and the target air flowrate is calculated taking that equivalent fuel amount into account. Accordingly, the target air flowrate is calculated taking into account the carbon dioxide produced by the oxidation of the particulates so more accurate EGR rate control is possible.

In this second example embodiment, the ECU 22 functions as an EGR control apparatus of the invention by executing the control routine in FIG. 6, as a converting apparatus of the invention by executing step S22 in FIG. 6, and as a target air flowrate calculating apparatus of the invention by executing step S8 in FIG. 6.

Third Example Embodiment

Next, a third example embodiment of the invention will be described with reference to FIG. 8. This third example embodiment is carried out in combination with the foregoing example embodiments, with the routine shown in FIG. 8 being executed instead of step S9 in FIG. 5 or step S9 in FIG. 6.

Figure 8:
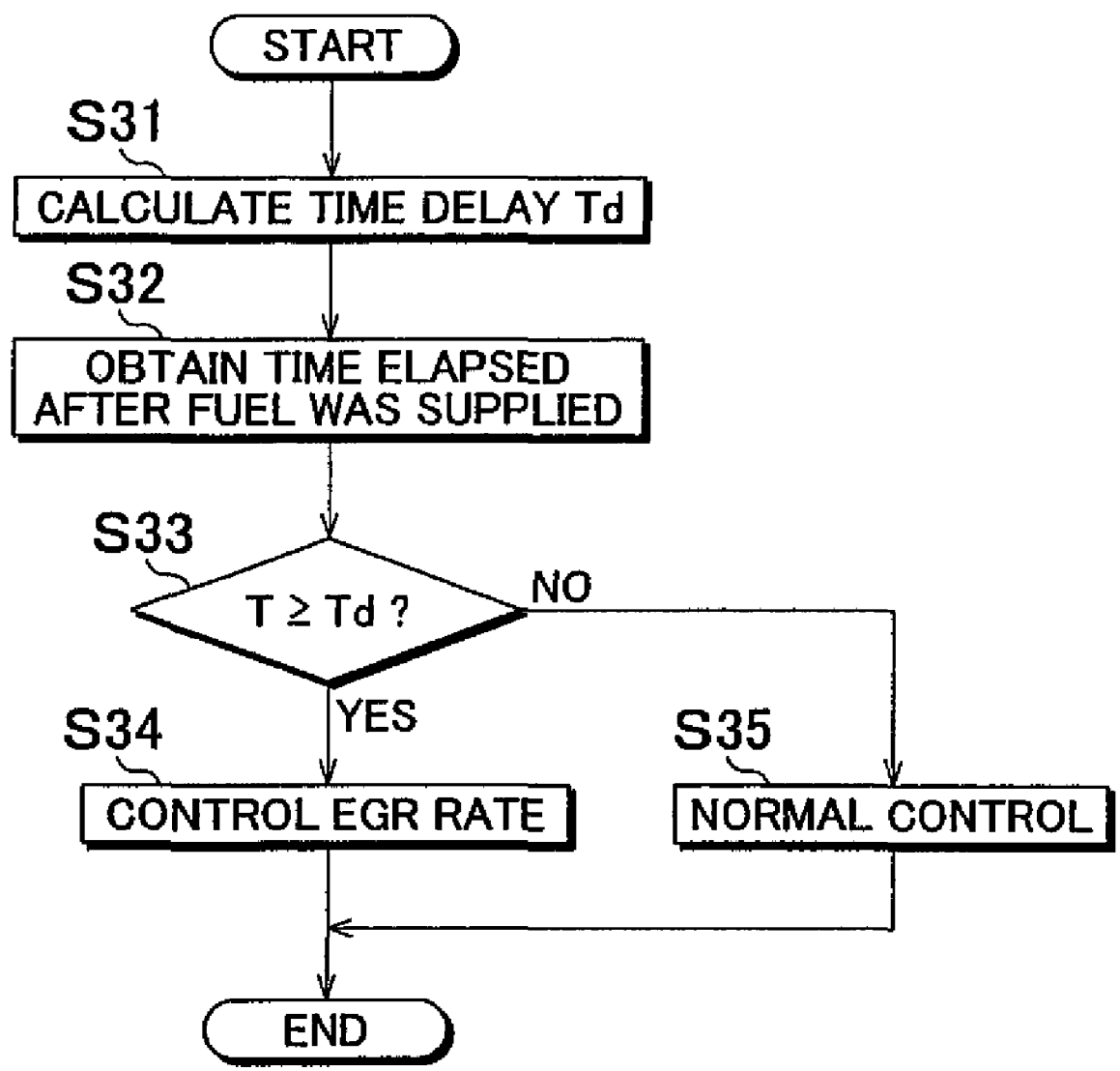
FIG. 8 is a flowchart illustrating an example of a routine according to a third example embodiment of the invention which is executed instead of step S9 in FIG. 5 or step S9 in FIG. 6.

FIG. 8 is a flowchart illustrating one example of a routine according to a third example embodiment that is executed instead of step S9 in FIG. 5 or step S9 in FIG. 6. First, the ECU 22 calculates a time delay Td from the time at which fuel is supplied by the fuel adding valve 14 in step S31 until a change occurs in the carbon dioxide concentration of the intake gas that is drawn into the cylinders 2 following that supply of fuel. This time delay Td is the time that it takes for the exhaust gas that has passed by the fuel adding valve 14 to reach the cylinders 2 via the low-pressure EGR passage 16 and the intake passage 4. The time delay Td changes according to the speed of the internal combustion engine 1. Therefore, it is also possible to measure the time delay Td in advance through testing, store the measurement results in the form of a map in the ECU 22, and calculate the time delay Td according to the current speed by referring to that map. Also, if the volume of the path along which the exhaust gas that has passed by the fuel adding valve 14 travels to the cylinders 2 via the low-pressure EGR passage 16 and the intake passage 4 is designated V and the exhaust gas amount per one operating cycle of the internal combustion engine 1 is designated $G_{ex}$, then $V/G_{ex}$ cycle will elapse before the exhaust gas that is discharged from the cylinders 2 is drawn in. $V/G_{ex}$ can be known beforehand so the time delay Td can also be calculated based on the current speed and $V/G_{ex}$.

Next, in step S32, the ECU 22 obtains the time T that has elapsed since the fuel is supplied by the fuel adding valve 14 (this time T may also be referred to as the "elapsed time T"), and in step S33, the ECU determines whether that elapsed time T is equal to or longer than the time delay Td. If the elapsed time T is equal to or longer than the time delay Td, the process proceeds on to step S34 which is the same as step S9 in FIG. 5 and step S9 in FIG. 6. That is, the EGR rate control described above which is based on the target air flowrate $G_{a2}$ is executed. If, on the other hand, the elapsed time T is shorter than the time delay Td, the process proceeds on to step S35, which is the same as step S5 in FIG. 5 and step S5 in FIG. 6, such that the normal control described above is executed.

According to this example embodiment, the control accuracy is improved because the EGR rate control described above is executed in sync with the time that is delayed for a period of the time delay Td. As a result, combustion is able to be reliably prevented from becoming unstable after fuel is supplied by the fuel adding valve 14.

Figure 9:
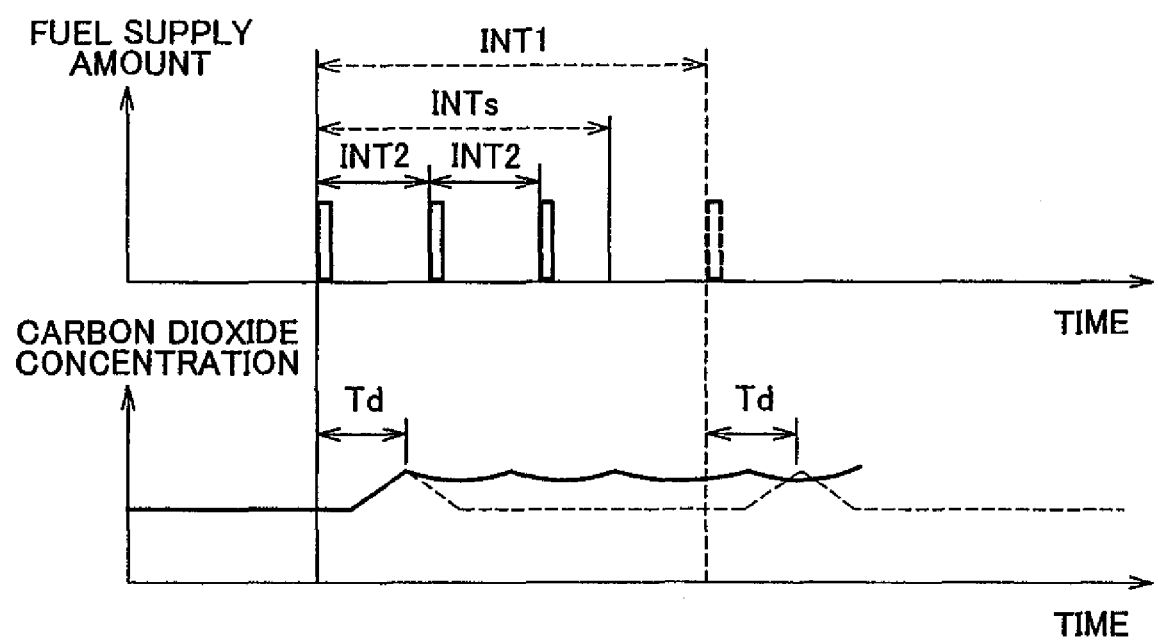
FIG. 9 is a time chart showing the fuel supply intervals and the change over time in the carbon dioxide concentration of the intake gas.

Incidentally, this example embodiment may be modified as follows. The fuel adding valve 14 may supply fuel a plurality of times at predetermined intervals according to the purpose. FIG. 9 is a time chart showing the fuel supply intervals and the change over time in the carbon dioxide concentration of the intake gas. Incidentally, in this drawing, the EGR rate control described above is not being executed. As shown in FIG. 9, with the intervals INT1 in which the fuel supply is long, the peak of the change in the carbon dioxide concentration appears each time fuel is supplied, as shown by the broken line. In contrast, with the intervals INT2 in which the fuel supply is short, the peak of the change in the carbon dioxide is much less pronounced. That is, the peak of the change in the carbon dioxide concentration becomes less pronounced as the fuel supply intervals become shorter. Therefore, when the fuel supply intervals are equal to or less than a predetermined reference INTs, which is a lower limit value of a range within which the carbon dioxide concentration of the intake gas can be regarded as being substantially constant, it is not necessary that the EGR rate control be executed in sync with the time that is delayed for a period of the time delay, Td, as was described with reference to FIG. 8, each time fuel is supplied by the fuel adding valve 14. If the EGR rate control is executed in sync with the time that is delayed for a period of the time delay Td, the control may in fact become unstable. Therefore, by changing the control shown in FIG. 8 to the control shown in FIG. 10, it is possible to execute the EGR rate control executed in sync with the time that is delayed for a period of the time delay Td taking the fuel supply intervals into account.

Figure 10:
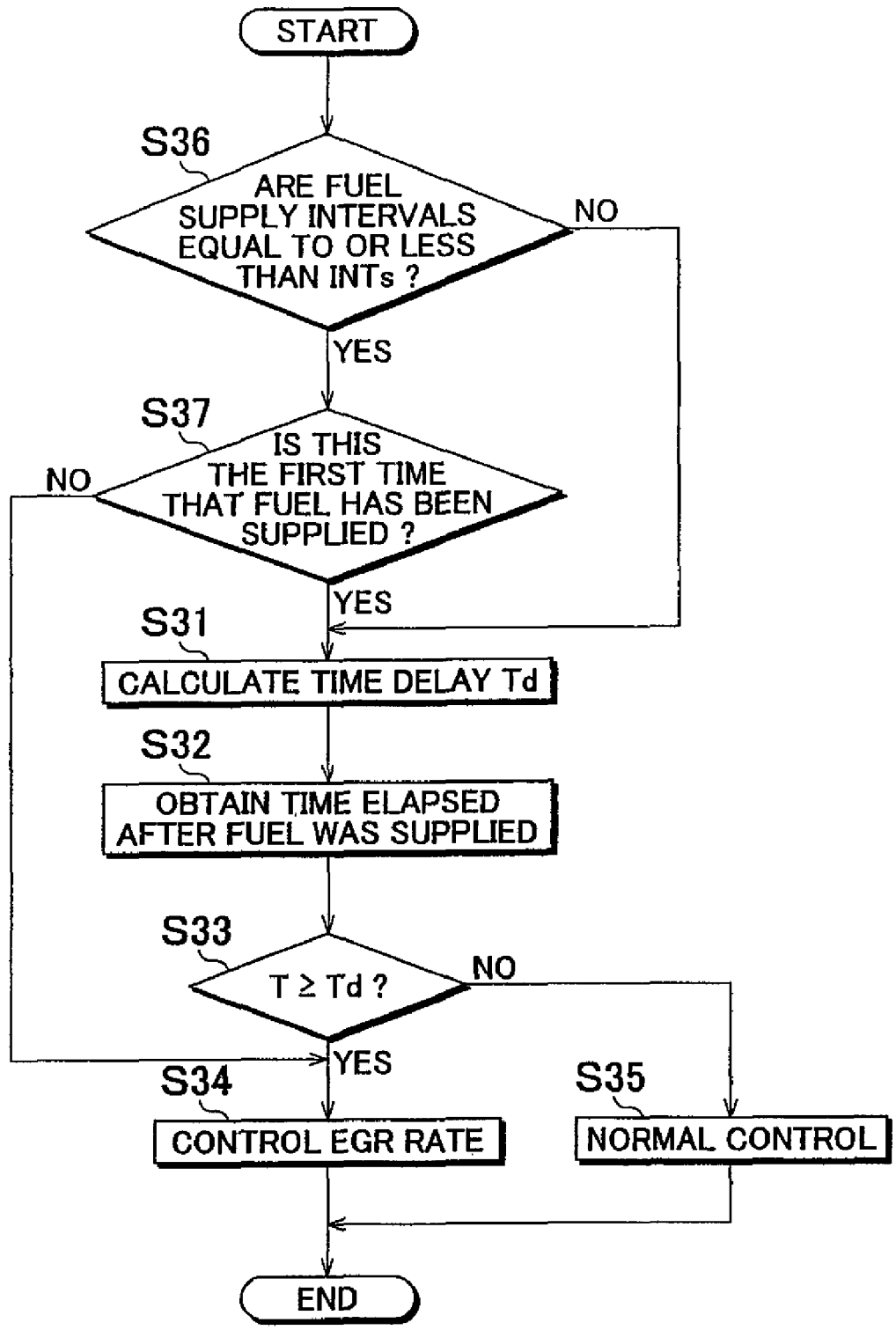
FIG. 10 is a flowchart illustrating a modified example of the control shown in FIG. 8.

As shown in FIG. 10, first in step S36, the ECU 22 determines whether the fuel supply intervals are equal to or less than the reference INTs. If the fuel supply intervals are equal to or less than the reference INTs, the process proceeds on to step S37. If not, the process proceeds on to step S31. In step S37, the ECU 22 determines whether this is the first time that fuel has been supplied. This determination can be made based on the time that has elapsed after the fuel was supplied the last time or on the control state of the filter recovery process or the like that is executed in parallel with the routine of this example embodiment. If it is determined that this is the first time that the fuel has been supplied, synchronization of the EGR control with the time that is delayed for a period of the time delay Td is necessary so the process proceeds on to step S31. If it is not the first time that fuel has been supplied, then steps S31 to S33 are skipped and the process proceeds on to step S34. Steps S31 to S35 are the same as the steps in FIG. 8 so a description thereof will be omitted.

According to the example embodiment illustrated in FIG. 10, if the fuel supply intervals are equal to or less than the reference INTs, then the EGR rate control is synchronized with the time that is delayed for a period of the time delay Td related to the first supply of fuel and then continued until the next supply of fuel. Incidentally, the first supply of fuel includes both the first (i.e., initial) fuel supply of a group or set, as well as fuel that is supplied after a predetermined period of time has elapsed after the last time that fuel was supplied. Accordingly, when the fuel supply intervals are equal to or less than the reference INTs and the EGR rate control is in sync with the last fuel supply, the EGR rate control is not synchronized with the next fuel supply. As a result, efficient EGR control is possible so the control stability also improves.

In this third example embodiment, the ECU 22 functions as an EGR control apparatus of the invention by executing the control routine in FIG. 5 or FIG. 6 and replacing step S9 in FIG. 5 or step S9 in FIG. 6 with the process in FIG. 8.

Fourth Example Embodiment

Next, a fourth example embodiment of the invention will be described with reference to FIG. 11. This example embodiment is carried out in combination with the foregoing example embodiments. In brief, when the MPL mode described above is selected, the ECU 22 operates the low-pressure EGR apparatus according to the change rate of the target air flowrate, and performs feedback control on the gas flowrate of the EGR gas that is introduced by the high-pressure EGR apparatus so that the difference between the target air flowrate and the actual air flowrate decreases.

Figure 11:
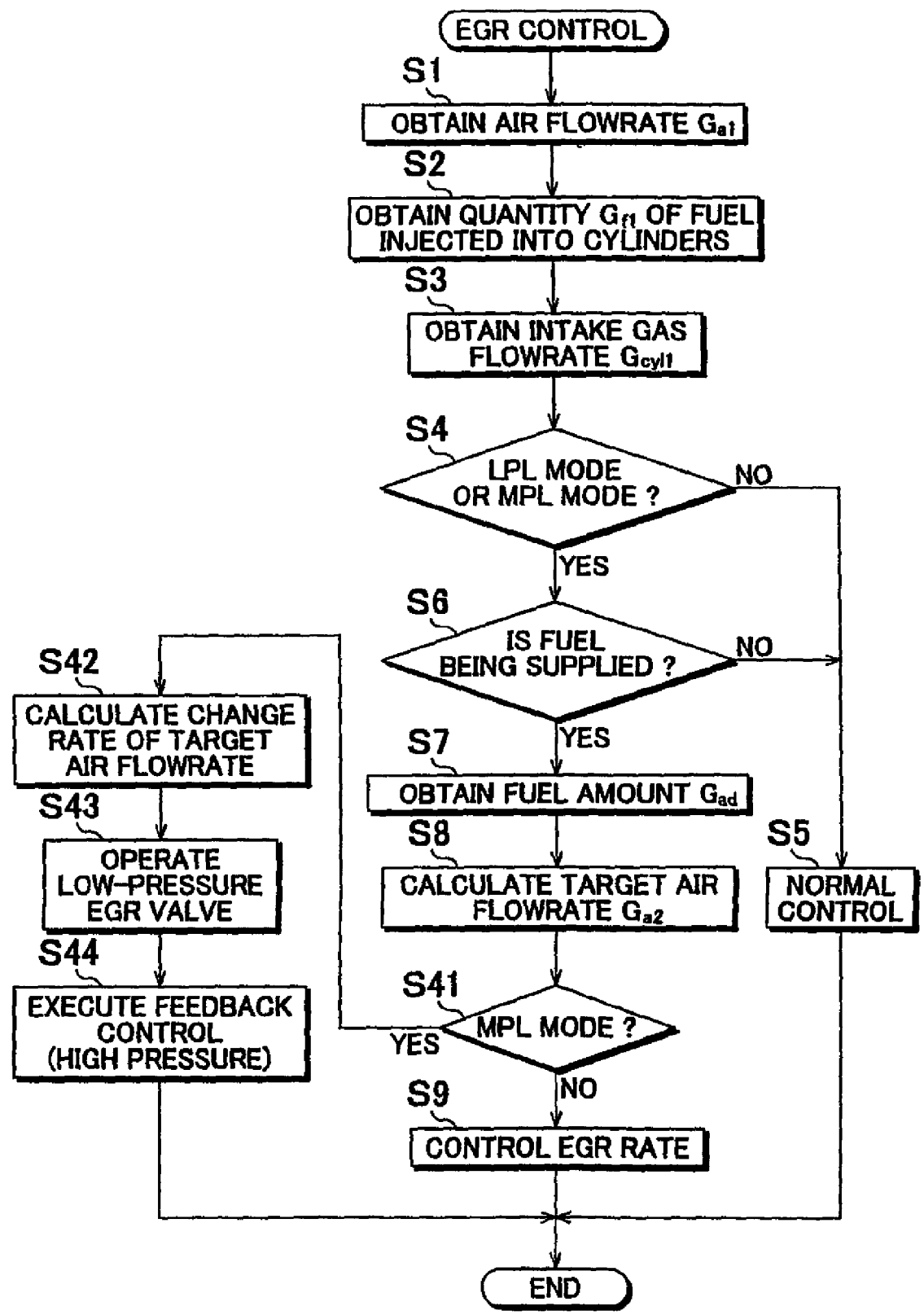
FIG. 11 is a flowchart illustrating an example of a control routine according to a fourth example embodiment of the invention.

FIG. 11 is a flowchart illustrating an example of a control routine for EGR control according to the fourth example embodiment. In the drawing, the steps that are the same as those in FIG. 5 will be denoted by the same step numbers and descriptions of those steps will be omitted. After calculating the target air flowrate $G_{a2}$ in step S8, the ECU 22 determines whether the MPL mode is currently selected in step S41. If the MPL mode is selected, the process proceeds on to step S42. If not, i.e., if the LPL mode is selected, the process proceeds on to step S9 and the control described above is executed.

In step S42, the ECU 22 calculates the change rate of the target air flowrate before and after fuel is supplied by the fuel adding valve 14. This change rate corresponds to the ratio of the target air flowrate that is calculated and stored in step S5 before the fuel is supplied to the target air flowrate that is calculated in step S8. Next, in step S43, the ECU 22 controls the low-pressure EGR apparatus 15 to make the opening amount of the low-pressure EGR valve 18 correspond to that change rate. The opening amount of the low-pressure EGR valve 18 can be calculated by storing a map that provides the opening amount ratio of the EGR valve 18 before and after the fuel supply with the change rate of the target air flowrate as a variable, obtaining the opening amount ratio with the ECU 22 by referencing that map, and multiplying that opening amount ratio by the current opening amount of the low-pressure EGR valve 18. That map can be prepared by obtaining through testing i) the ratio of the air flowrate at which the oxygen concentration is constant before and after the fuel is supplied, and ii) the opening amount ratio of the low-pressure EGR valve 18 before and after the fuel corresponding to that air flowrate ratio is supplied. Next, in step S44, the ECU 22 operates the high-pressure EGR apparatus 19 and feedback controls the gas flowrate of the EGR gas that is introduced so that the difference between the air flowrate $G_{a1}$ and the target air flowrate $G_{a2}$ decreases. Then this cycle of the routine ends.

According to this example embodiment, in the MPL mode, the low-pressure EGR apparatus 15 is operated according to the change rate of the target air flowrate so the difference between the air flowrate $G_{a1}$ and the target air flowrate $G_{a2}$ is reduced. That is, the current air flowrate is brought closer to the target air flowrate $G_{a2}$ by operating the low-pressure EGR apparatus 15. Then the high-pressure EGR apparatus 19 is feedback controlled so that the difference between the air flowrate $G_{a1}$ and the target air flowrate $G_{a2}$ becomes smaller. The path from which the EGR gas of the high-pressure EGR apparatus 19 is introduced is shorter than the path from which the EGR gas of the low-pressure EGR apparatus 15 is introduced so the response of the high-pressure EGR apparatus 19 is better than that of the low-pressure EGR apparatus 15. Accordingly, the current air flowrate can be quickly brought to the target air flowrate $G_{a2}$ by operating the high-pressure EGR apparatus 19 while operating the low-pressure EGR apparatus 15, as in this example embodiment.

In this example embodiment, the ECU 22 functions as i) an EGR control apparatus of the invention by executing the control routine in FIG. 11, ii) a target air flowrate calculating apparatus of the invention by executing steps S5 and S8 in FIG. 11, iii) a low-pressure EGR control apparatus of the invention by executing steps S42 and S43 in FIG. 11, and iv) a high-pressure EGR feedback control apparatus by executing step S44 in FIG. 11.

Fifth Example Embodiment

Next, a fifth example embodiment of the invention will be described with reference to FIG. 12. This example embodiment is carried out in combination with the foregoing example embodiments with the exception of the fourth example embodiment. In brief, when the MPL mode is selected, the ECU 22 feedback controls the gas flowrate of the EGR gas that is introduced by the high-pressure EGR apparatus 19 so that the difference between the target air flowrate and the actual air flowrate decreases, and prohibits that feedback control while fuel is being supplied by the fuel adding valve 14.

Transient response in the MPL mode can be ensured by this kind of feedback control. However, if feedback control is continued even when fuel is being supplied by the fuel adding valve 14 in the MPL mode, the target air flowrate will increase when it is calculated taking the amount of fuel supplied by the fuel adding valve 14 into account in the foregoing example embodiments. In association with this increase, the gas flowrate of the EGR gas that is introduced by the high-pressure EGR apparatus 19 is controlled so that it becomes smaller, which results in a drop in the intake air temperature as well as the exhaust gas temperature. To compensate for those drops, the amount of fuel supplied by the fuel adding valve 14 must be increased, which reduces fuel efficiency. Therefore, the ECU 22 prevents this kind of problem by repeatedly executing the control routine shown in FIG. 12 at predetermined intervals.

Figure 12:
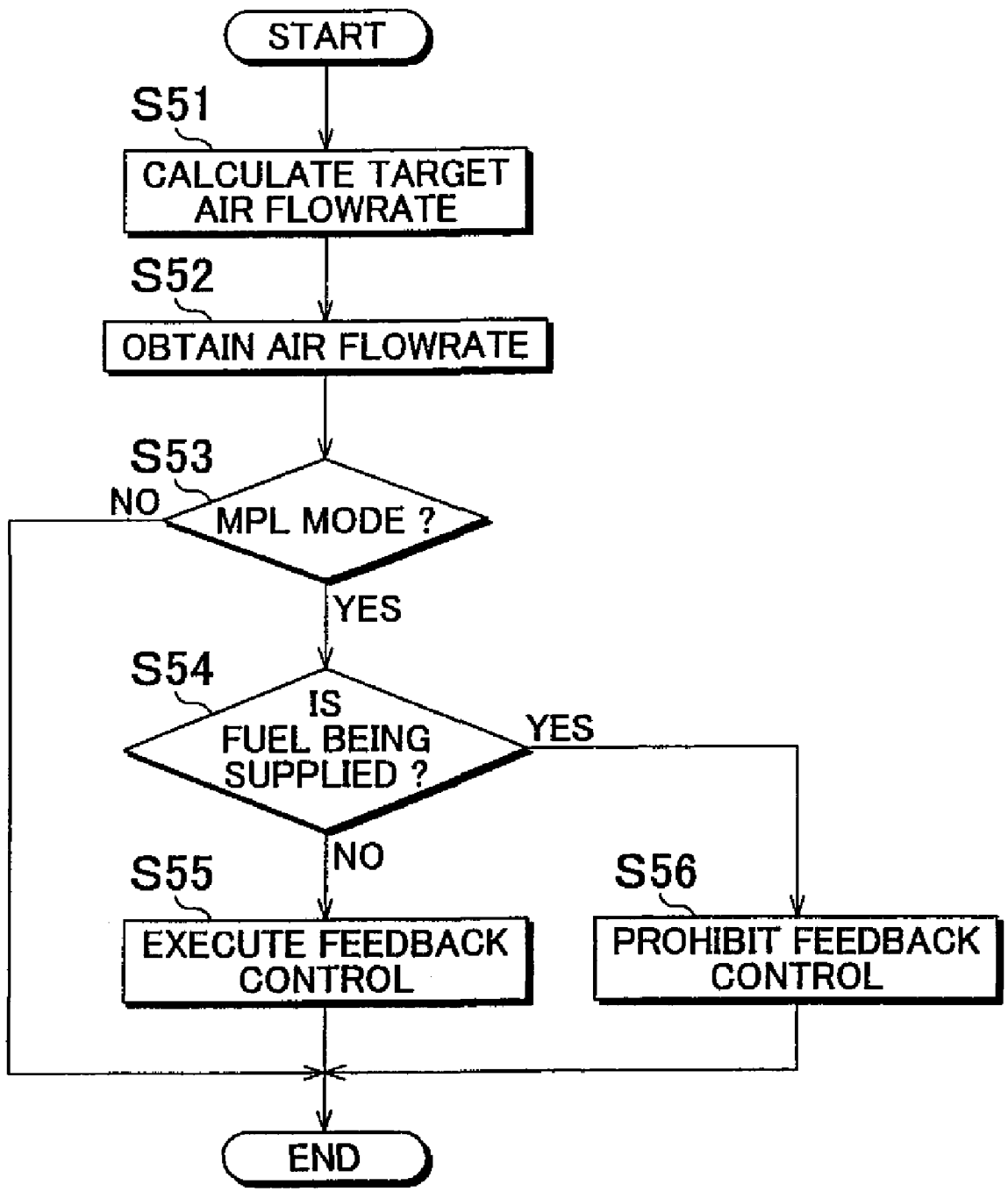
FIG. 12 is a flowchart illustrating an example of a control routine according to a fifth example embodiment of the invention.

As shown in FIG. 12, first in step S51, the ECU 22 calculates the target air flowrate according to the operating state of the internal combustion engine 1. The target air flowrate may also be calculated according to Expression 1 above, however. Next, in step S52, the ECU 22 obtains the current air flowrate from the signal output by the airflow meter 6.

Next, in step S53, the ECU 22 determines whether the current introduction mode is the MPL mode. If the current introduction mode is not the MPL mode, the rest of the steps are skipped and this cycle of the routine ends. If, on the other hand, the introduction mode is the MPL mode, the process proceeds on to step S54, where the ECU 22 determines whether fuel is currently being supplied by the fuel adding valve 14.

If fuel is not currently being supplied, the process proceeds on to step S55 where the ECU 22 reduces the flowrate of gas that is introduced by the high-pressure EGR apparatus 19 to reduce the difference between the target air flowrate that is calculated in step S51 and the air flowrate that is obtained in step S52. Then this cycle of the routine ends. The control in step S55 is executed by controlling the opening amount of the high-pressure EGR valve 21. If, on the other hand, fuel is currently being supplied, this kind of feedback control is prohibited and this cycle of the routine ends. In this case, the feedback control is prohibited so the EGR gas flowrate is prevented from decreasing by the opening amount of the high-pressure EGR valve 21 being reduced from the change in the target air flowrate following the supply of fuel.

According to this example embodiment, when fuel is supplied by the fuel adding valve 14 in the MPL mode, feedback control is prohibited so that the flowrate of EGR gas that is introduced by the high-pressure EGR apparatus 19 will not decrease. Accordingly, the change in the flowrate of EGR gas that is introduced by the high-pressure EGR apparatus 19 can be suppressed. As a result, the amount of fuel that is supplied by the fuel adding valve 14 does not need to be increased, so a decline in fuel efficiency is able to be suppressed.

In the fifth example embodiment, the ECU 22 functions as i) an EGR control apparatus and a target air flowrate calculating apparatus of the invention by executing the EGR control of the foregoing example embodiments, ii) a high-pressure EGR feedback control apparatus of the invention by executing step S55 in FIG. 12, and iii) a feedback control prohibiting apparatus of the invention by executing step S56 in FIG. 12.

Sixth Example Embodiment

Next, a sixth example embodiment of the invention will be described with reference to FIG. 13. This example embodiment is carried out in combination with the example embodiments described above. The member unique to this example embodiment is shown by the broken line in FIG. 1. Thus, FIG. 1 will be referred to in the following description. As shown by the broken line in FIG. 1, an oxygen concentration sensor 27 is provided downstream of the exhaust gas control apparatus 10. This oxygen concentration sensor 27 serves as an oxygen concentration detecting device that detects the oxygen concentration in the exhaust gas. The signal output from this oxygen concentration sensor 27 is sent to the ECU 22. In the foregoing example embodiments, the target air flowrate after the fuel is supplied by the fuel adding valve 14 is obtained by calculation so that the oxygen concentration of the intake gas before and after the fuel is supplied by the fuel adding valve 14 is constant. In other words, in the foregoing example embodiments, the target air flowrate after the fuel is supplied by the fuel adding valve 14 is estimated from the operating state of the internal combustion engine 1 before that fuel is supplied. While the internal combustion engine 1 is actually operating, those estimation results and the actual target air flowrate are completely different for various reasons. Therefore, in this example embodiment, in order to eliminate that difference, the target air flowrate that is calculated according to Expression 1 or Expression 11 above is corrected based on the oxygen concentration that is measured by the oxygen concentration sensor 27.

Figure 13:
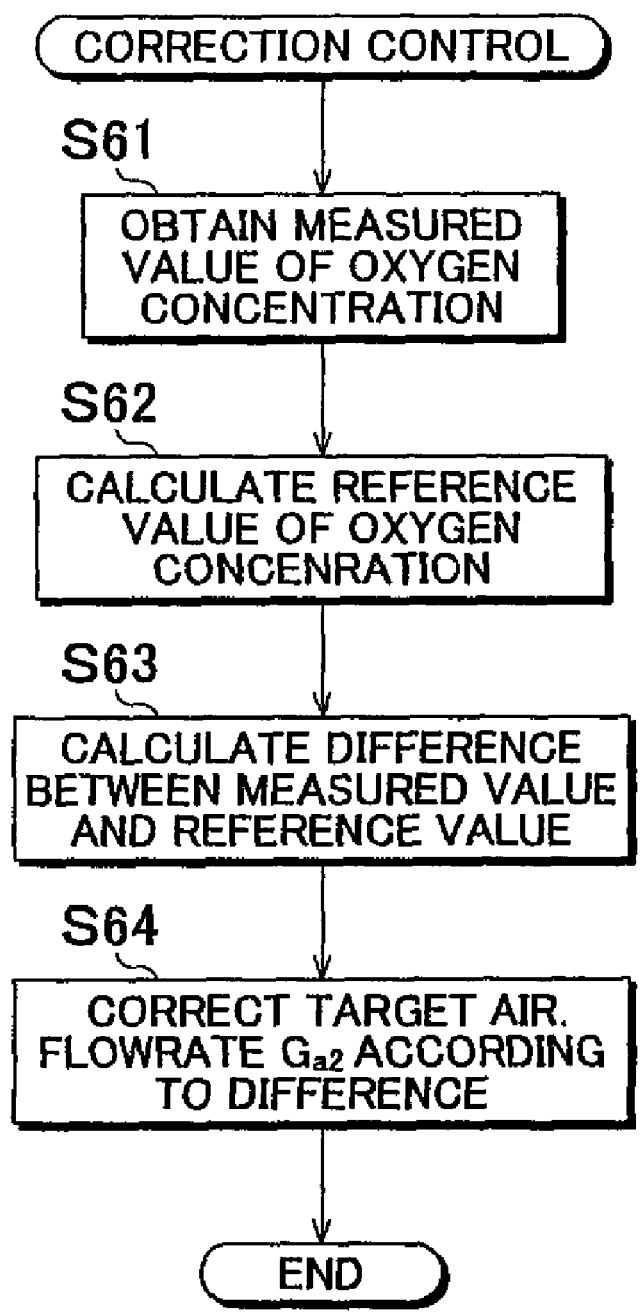
FIG. 13 is a flowchart illustrating an example of a control routine according to a sixth example embodiment of the invention.

FIG. 13 is a flowchart illustrating an example of a control routine according to the sixth example embodiment of the invention. The program of this routine is repeatedly executed at predetermined operation cycles. First, in step S61, the ECU 22 obtains a measured value of the oxygen concentration of the exhaust gas that flows downstream of the exhaust gas control apparatus 10 based on a signal from the oxygen concentration sensor 27. Then in step S62, the ECU 22 calculates a reference value for the oxygen concentration. This reference value is the oxygen concentration according to the operating state of the internal combustion engine 1 and is obtained beforehand through testing. Next, in step S63, the ECU 22 calculates the difference between the measured value and the reference value, and then in step S64, the ECU 22 corrects, according to that difference, the target air flowrate $G_{a2}$ that is calculated according to Expression 1 or Expression 11. Then this cycle of the routine ends. The degree to which the target air flowrate $G_{a2}$ is corrected increases the greater that difference is.

According to this example embodiment, the target air flowrate $G_{a2}$ is corrected according to the difference between the measured value and the reference value that is obtained beforehand. Therefore, even if there is a difference between the estimated state after the fuel supply and the actual state, that difference would be able to be eliminated, thus improving the EGR rate control accuracy.

In the sixth example embodiment, the ECU 22 functions as an EGR control apparatus and a target air flowrate calculating apparatus of the invention by executing the EGR control of the foregoing example embodiments, and as an air flowrate correcting apparatus of the invention by executing the control in FIG. 13.

Seventh Example Embodiment

Next, a seventh example embodiment of the invention will be described with reference to FIG. 14. This example embodiment is carried out in combination with the foregoing example embodiments, with the routine shown in FIG. 14 being executed instead of step S9 in FIG. 5 or step S9 in FIG. 6.

Figure 14:
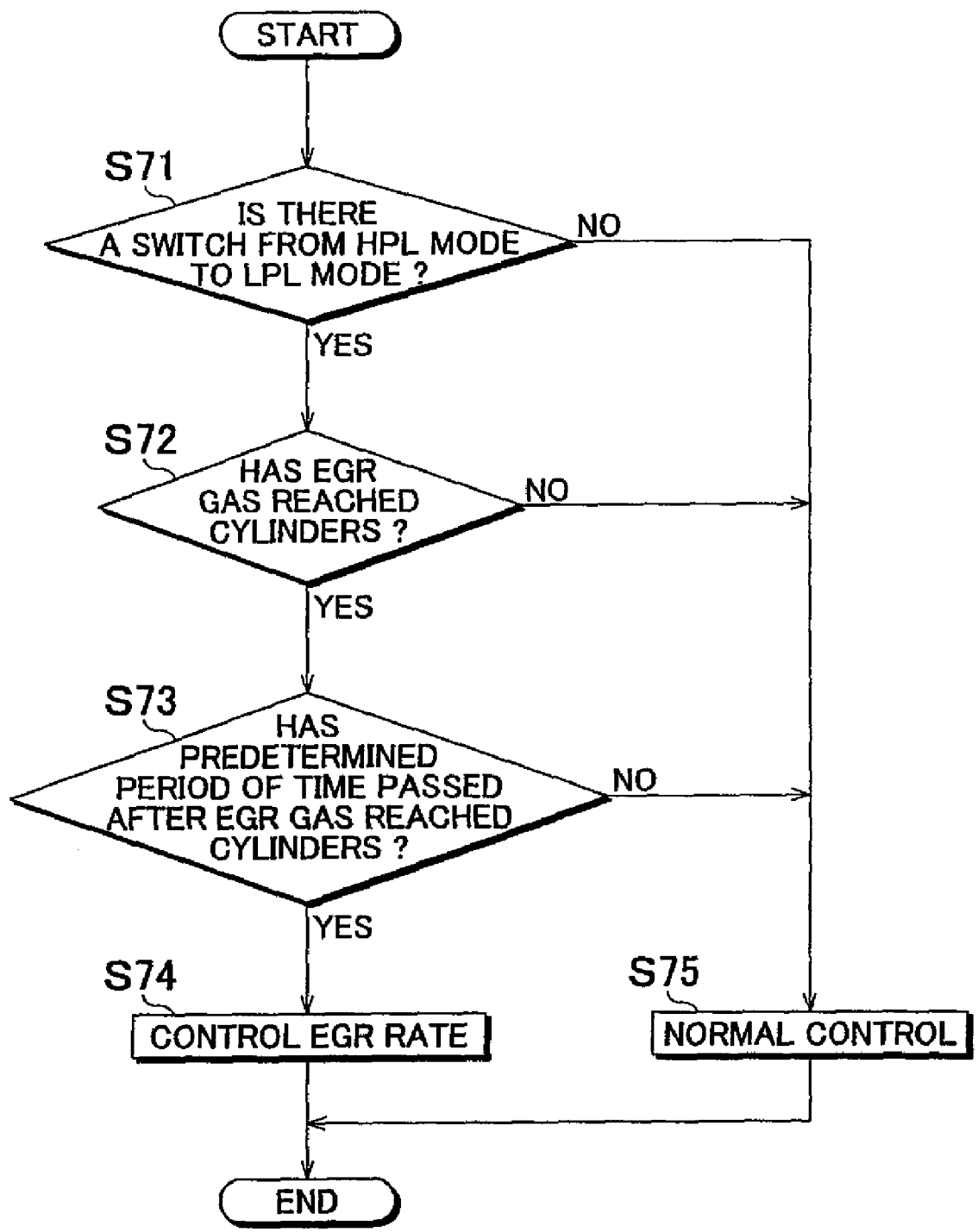
FIG. 14 is a flowchart illustrating an example of a routine according to a seventh example embodiment of the invention which is executed instead of step S9 in FIG. 5 or step S9 in FIG. 6.

FIG. 14 is a flowchart illustrating an example of a routine according to the seventh example embodiment, which is executed instead of step S9 in FIG. 5 or step S9 in FIG. 6. First in step S71, the ECU 22 determines whether the introduction mode has switched from the HPL mode to the LPL mode. If such that switch has not occurred, the process proceeds on to step S75 where normal control is executed, after which this cycle of the routine ends. That is, this cycle of the routine ends after EGR rate control according to the introduction mode has been performed.

Next, if the introduction mode has switched from the HPL mode to the LPL mode, the process proceeds on to step S72 where the ECU 22 determines whether the EGR gas from the low-pressure EGR apparatus 15 has reached the cylinders 2. The time that it takes for the EGR gas to reach the cylinders changes depending on the air flowrate (hereinafter this time may also be referred to as the "time-to-cylinder"). Therefore, the time-to-cylinder for each air flowrate can be obtained in advance through testing, and a map which provides those times-to-cylinder with the air, flowrate as a variable can be stored in the ECU 22. The ECU 22 can then estimate the time-to-cylinder by referencing this map. As a result, the determination in step S72 can be made by comparing the estimated time-to-cylinder with the time that has elapsed since the introduction mode is switched.

If it is determined in step S72 that the EGR gas has not reached the cylinders 2, then the process proceeds on to step S75 where the normal control is executed. If, on the other hand, the EGR gas has reached the cylinders 2, the process proceeds on to step S73 where the ECU 22 determines whether a predetermined period of time has elapsed after the EGR gas reached the cylinders 2. This predetermined period of time is set according to the operating state of the internal combustion engine 1 as the time at which the large amount of air in the EGR gas during the initial stage of the switch is decreased to the extent where the EGR gas components can be regarded as being stable. If the predetermined period of time has not elapsed, the process proceeds on to step S75 where the normal control is executed. If, on the other hand, the predetermined period of time has elapsed, the process proceeds on to step S74 where the EGR rate control described above is executed, after which this cycle of the routine ends.

According to this example embodiment, after the introduction mode is switched from the HPL mode to the LPL mode, the EGR rate control described above is executed after the EGR gas components have become stable. Accordingly, the air-fuel ratio of the intake gas that is drawn into the cylinders is prevented from becoming lean. As a result, an increase in the amount of nitrogen oxide that is discharged can be suppressed.

In the seventh example embodiment, the ECU 22 functions as an EGR control apparatus of the invention by executing the control routine in FIG. 5 or FIG. 6, with the routine in FIG. 14 being executed instead of the step S9 in FIG. 5 or step S9 in FIG. 6.

The invention is not limited to the foregoing example embodiments. That is, the invention may also be modified without departing from the scope thereof. For example, in the foregoing example embodiments, the invention is applied to an internal combustion engine that is provided with a turbocharger. Alternatively, however, the invention may be applied to an internal combustion engine that is not provided with a turbocharger. Also, the structure of the EGR system is not particularly limited, i.e., it is not limited to the example shown in the drawing, as long as it removes EGR gas from downstream of the fuel supply device and the exhaust gas control apparatus.

Also, in addition to the particulate trapping function, the exhaust gas control apparatus 10 may also be provided with an exhaust gas purifying function that stores and reduces $NO_x$, by coating the substrate of the filter shown in FIG. 1 with $NO_x$ storage-reduction catalyst material (i.e., storage-reduction type $NO_x$ catalyst material). When the exhaust gas control apparatus 10 is provided with this kind of function, a rich spike process is performed which reduces stored $NO_x$ by injecting fuel from the fuel adding valve 14 so that the air-fuel ratio of the exhaust gas temporarily becomes rich before the amount of stored $NO_x$ reaches the limit. Also, when the exhaust gas control apparatus 10 has been sulfur poisoned, a well-known sulfur poisoning recovery process in which fuel is injected from the fuel adding valve 14 is also performed to recover the exhaust gas control apparatus 10 from that sulfur poisoning and restore its exhaust gas purifying function. The rich spike process and the sulfur poisoning recovery process are similar to the filter recovery process and the clogging prevention process described above in that they supply fuel into the exhaust passage 5. Therefore, the exhaust gas system of the invention may also be carried out in a mode in which control similar to the control of the foregoing example embodiments is executed during the rich spike process or during the sulfur poisoning recovery process.

Also, a cooling apparatus, not shown, may be provided in the high-pressure EGR passage 20, and in exceptional circumstances, EGR gas may be introduced via the cooling apparatus by the high-pressure EGR apparatus 19 in part of the operating region where the introduction mode should be switched to the MPL mode or the LPL mode. This suppresses an excessive increase in the air temperature, and thus prevents an increase in smoke. Also, because EGR gas is introduced by the high-pressure EGR apparatus 19 during that time, the flowrate of the exhaust gas that passes through the filter 13 can be accurately estimated. As a result, a decline in the calculation accuracy of the amount of fuel supplied by the fuel adding valve 14 that is used in Expression 9 can be prevented.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. An internal combustion engine exhaust gas system comprising:
    an exhaust gas control apparatus which is arranged in an exhaust passage of the internal combustion engine and purifies exhaust gas;
    a fuel supply device which is arranged upstream of the exhaust gas control apparatus and supplies fuel into the exhaust passage;
    an exhaust gas recirculation apparatus that removes some of the exhaust gas from downstream of the exhaust gas control apparatus as EGR gas and introduces that removed exhaust gas into an intake passage of the internal combustion engine; and
    an exhaust gas recirculation control apparatus which, taking into account the amount of fuel supplied by the fuel supply device, controls an EGR rate, which is the percentage of EGR gas in intake gas that is drawn into a cylinder of the internal combustion engine in a state in which the EGR gas introduced by the exhaust gas recirculation apparatus is mixed with air introduced into the intake passage, such that an oxygen concentration of the intake gas is constant before and after fuel is supplied by the fuel supply device.

2. The exhaust gas system according to claim 1, wherein the internal combustion engine is provided with a turbocharger which has a compressor that is arranged in the intake passage and a turbine that is arranged in the exhaust passage in a state integrally rotatable with the compressor, the turbocharger providing a pressure boost by driving the compressor using exhaust gas energy captured by the turbine, and wherein the exhaust gas recirculation apparatus includes a low-pressure exhaust gas recirculation apparatus that is arranged such that EGR gas is removed from the exhaust passage at a location downstream of the turbine of the turbocharger and the removed EGR gas is introduced into the intake passage at a location upstream of the compressor of the turbocharger.

3. The exhaust gas system according to claim 1, wherein the exhaust gas control apparatus includes a filter that traps particulates in the exhaust gas, and wherein the exhaust gas recirculation control apparatus includes i) a converting apparatus that converts an oxidation amount of particulates, which is the amount of particulates, trapped in the filter, that are oxidized when the fuel is supplied by the fuel supply device, to an equivalent fuel amount that corresponds to the oxidation amount, and ii) a target air flowrate calculating apparatus that calculates a target air flowrate of air that is introduced into the intake passage, taking into account the equivalent fuel amount that is converted by the converting apparatus, the exhaust gas recirculation control apparatus controlling the EGR rate based on the target air flowrate that is calculated by the target air flowrate calculating apparatus.

4. The exhaust gas system according to claim 1, wherein the exhaust gas recirculation control apparatus is provided with a target air flowrate calculating apparatus that calculates, taking into account the amount of fuel that is supplied by the fuel supply device, a target air flowrate of air that is introduced into the intake passage after fuel is supplied by the fuel supply device assuming that the flowrate of the intake gas is constant before and after the fuel is supplied by the fuel supply device, the exhaust gas recirculation control apparatus controlling the EGR rate based on the target air flowrate that is calculated by the target air flowrate calculating apparatus.

5. The exhaust gas system according to claim 4, wherein the target air flowrate calculating apparatus calculates the target air flowrate based on an expression $$G_{a2} = \frac{G_{cyl1} \times G_{a1} \times (G_{f1} + G_{ad})}{\{(G_{cyl1} - G_{a1}) \times G_{f1} + G_{a1} \times (G_{f1} + G_{ad})\}}$$

where Ga2 represents the target air flowrate, Ga1 represents an intake air flowrate before fuel is supplied by the fuel supply device, Gcyl1 represents a flowrate of the intake gas, Gf1 represents a quantity of fuel injected into the cylinder, and Gad represents the amount of fuel supplied by the fuel supply device.

6. The exhaust gas system according to claim 3, further comprising:
an oxygen concentration detecting device which is arranged downstream of the exhaust gas control apparatus and detects an oxygen concentration of the exhaust gas,
wherein the exhaust gas recirculation control apparatus includes an air flowrate correcting apparatus that corrects the target air flowrate that is calculated by the target air flowrate calculating apparatus, taking into account the oxygen concentration detected by the oxygen concentration detecting device.

7. The exhaust gas system according to claim 1, wherein the exhaust gas recirculation control apparatus synchronizes the control of the EGR rate with a time that is delayed from a time at which fuel is supplied by the fuel supply device until a change occurs in a carbon dioxide concentration of the intake gas following the supply of fuel by the fuel supply device.

8. The exhaust gas system according to claim 7, wherein the fuel supply device is structured to supply fuel a plurality of times at predetermined intervals of time, and when the predetermined intervals of time are equal to or less than a predetermined reference, the exhaust gas recirculation control apparatus, after the control of the EGR rate has been synchronized with the delayed time related to the last time fuel was supplied, continues to control the EGR rate until the next time fuel is supplied.

9. The exhaust gas system according to claim 1, wherein the internal combustion engine is provided with a turbocharger which has a compressor that is arranged in the intake passage and a turbine that is arranged in the exhaust passage in a state integrally rotatable with the compressor, the turbocharger providing a pressure boost by driving the compressor using exhaust gas energy captured by the turbine, and wherein the exhaust gas recirculation apparatus includes a low-pressure exhaust gas recirculation apparatus that is arranged such that EGR gas is removed from the exhaust passage at a location downstream of the turbine of the turbocharger and the removed EGR gas is introduced into the intake passage at a location upstream of the compressor of the turbocharger, and a high-pressure exhaust gas recirculation apparatus that is arranged such that EGR gas is removed from the exhaust passage at a location upstream of the turbine of the turbocharger and the removed EGR gas is introduced into the intake passage at a location downstream of the compressor of the turbocharger, and wherein a mode switching apparatus is further provided which switches, according to an operating state of the internal combustion engine, an introduction mode of EGR gas among a low pressure mode in which EGR gas is introduced into the intake passage using only the low-pressure exhaust gas recirculation apparatus, a high pressure mode in which EGR gas is introduced into the intake passage using only the high-pressure exhaust gas recirculation apparatus, and a middle mode in which EGR gas is introduced into the intake passage using both the low-pressure exhaust gas recirculation apparatus and the high-pressure exhaust gas recirculation apparatus.

10. The exhaust gas system according to claim 9, further comprising:
an air flowrate detecting device that detects an air flowrate of air that is introduced into the intake passage,
wherein the exhaust gas recirculation control apparatus includes i) a target air flowrate calculating apparatus that calculates a target air flowrate of air that is introduced into the intake passage, taking into account the amount of fuel supplied by the fuel supply device, ii) a low-pressure exhaust gas recirculation control apparatus that operates the low-pressure exhaust gas recirculation apparatus according to a change rate of the target air flowrate before and after fuel is supplied by the fuel supply device when the introduction mode has been switched to the middle mode by the mode switching apparatus, and iii) a high-pressure exhaust gas recirculation feedback control apparatus that feedback controls a gas flowrate of the EGR gas that is introduced by the high-pressure exhaust gas recirculation apparatus by operating the high-pressure exhaust gas recirculation apparatus, such that a difference between the target air flowrate calculated by the target air flowrate calculating apparatus and the air flowrate detected by the air flowrate detecting device decreases.

11. The exhaust gas system according to claim 9, further comprising:
a target air flowrate calculating apparatus that calculates a target air flowrate of air that is introduced into the intake passage;
an air flowrate detecting device that detects an air flowrate of the air that is introduced into the intake passage;
a high-pressure exhaust gas recirculation feedback control apparatus that feedback controls a gas flowrate of the EGR gas that is introduced by the high-pressure exhaust gas recirculation apparatus, such that a difference between the target air flowrate calculated by the target air flowrate calculating apparatus and the air flowrate detected by the air flowrate detecting device decreases; and a feedback control prohibiting apparatus that prohibits the feedback control by the high-pressure exhaust gas recirculation feedback control apparatus such that the gas flowrate of the EGR gas that is introduced by the high-pressure exhaust gas recirculation apparatus will not decrease, when the introduction mode has been switched to the middle mode by the mode switching apparatus and fuel is supplied by the fuel supply device, wherein the target air flowrate calculating apparatus calculates the target air flowrate taking into account the amount of fuel that is supplied by the fuel supply device when fuel is supplied by the fuel supply device, and the exhaust gas recirculation control apparatus controls the EGR rate based on the target air flowrate that is calculated by the target air flowrate calculating apparatus.

12. The exhaust gas system according to claim 9, wherein the exhaust gas recirculation control apparatus controls the EGR rate such that the oxygen concentration of the intake gas that is drawn into the cylinder of the internal combustion engine is constant before and after fuel is supplied by the fuel supply device, on a condition that a predetermined period of time has elapsed after the EGR gas that is introduced by the low-pressure exhaust gas recirculation apparatus has reached the cylinder of the internal combustion engine, after the introduction mode of the EGR gas has been switched from the high pressure mode to the low pressure mode by the mode switching apparatus.

13. A control method of an internal combustion engine exhaust gas system that includes an exhaust gas control apparatus which is arranged in an exhaust passage of the internal combustion engine and purifies exhaust gas, a fuel supply device which is arranged upstream of the exhaust gas control apparatus and supplies fuel into the exhaust passage, and an exhaust gas recirculation apparatus that removes some of the exhaust gas from downstream of the exhaust gas control apparatus as EGR gas and introduces that removed exhaust gas into an intake passage of the internal combustion engine, the control method comprising:
controlling an EGR rate, which is the percentage of EGR gas in intake gas that is drawn into a cylinder of the internal combustion engine in a state in which the EGR gas introduced by the exhaust gas recirculation apparatus is mixed with air introduced into the intake passage, taking into account the amount of fuel supplied by the fuel supply device, such that an oxygen concentration of the intake gas is constant before and after fuel is supplied by the fuel supply device.

14. The control method according to claim 13, wherein the internal combustion engine is provided with a turbocharger which has a compressor that is arranged in the intake passage and a turbine that is arranged in the exhaust passage in a state integrally rotatable with the compressor, the turbocharger providing a pressure boost by driving the compressor using exhaust gas energy captured by the turbine, and wherein the exhaust gas recirculation apparatus includes a low-pressure exhaust gas recirculation apparatus that is arranged such that EGR gas is removed from the exhaust passage at a location downstream of the turbine of the turbocharger and the removed EGR gas is introduced into the intake passage at a location upstream of the compressor of the turbocharger.

15. The control method according to claim 13, wherein the exhaust gas control apparatus includes a filter that traps particulates in the exhaust gas, and wherein an oxidation amount of particulates, which is the amount of particulates, trapped in the filter, that are oxidized when the fuel is supplied by the fuel supply device, is converted to an equivalent fuel amount that corresponds to the oxidation amount, a target air flowrate of air that is introduced into the intake passage is calculated taking into account the equivalent fuel amount that is converted, and the EGR rate is controlled based on the calculated target air flowrate.

16. The control method according to claim 13, wherein a target air flowrate of air that is introduced into the intake passage after fuel is supplied by the fuel supply device is calculated taking into account the amount of fuel that is supplied by the fuel supply device assuming that the flowrate of the intake gas is constant before and after the fuel is supplied by the fuel supply device, and the EGR rate is controlled based on the calculated target air flowrate.

17. The control method according to claim 16, wherein the target air flowrate is calculated based on an expression $$G_{a2} = \frac{G_{cyl1} \times G_{a1} \times (G_{f1} + G_{ad})}{\{(G_{cyl1} - G_{a1}) \times G_{f1} + G_{a1} \times (G_{f1} + G_{ad})\}}$$

where Ga2 represents the target air flowrate, Ga1 represents an intake air flowrate before fuel is supplied by the fuel supply device, Gcyl1 represents a flowrate of the intake gas, Gf1 represents a quantity of fuel injected into the cylinder, and Gad represents the amount of fuel supplied by the fuel supply device.

18. The control method according to claim 15, wherein the exhaust gas system further includes an oxygen concentration detecting device which is arranged downstream of the exhaust gas control apparatus and detects an oxygen concentration of the exhaust gas, and wherein the calculated target air flowrate is corrected taking into account the oxygen concentration detected by the oxygen concentration detecting device.

19. The control method according to claim 13, wherein the control of the EGR rate is synchronization with a time that is delayed from a time at which fuel is supplied by the fuel supply device until a change occurs in a carbon dioxide concentration of the intake gas following the supply of fuel by the fuel supply device.

20. The control method according to claim 19, wherein the fuel supply device is structured to supply fuel a plurality of times at predetermined intervals of time, and when the predetermined intervals of time are equal to or less than a predetermined reference, after the control of the EGR rate has been synchronized with the delayed time related to the last time fuel was supplied, the EGR rate continues to be controlled until the next time fuel is supplied.

21. The control method according to claim 13, wherein the internal combustion engine is provided with a turbocharger which has a compressor that is arranged in the intake passage and a turbine that is arranged in the exhaust passage in a state integrally rotatable with the compressor, the turbocharger providing a pressure boost by driving the compressor using exhaust gas energy captured by the turbine, and wherein the exhaust gas recirculation apparatus includes a low-pressure exhaust gas recirculation apparatus that is arranged such that EGR gas is removed from the exhaust passage at a location downstream of the turbine of the turbocharger and the removed EGR gas is introduced into the intake passage at a location upstream of the compressor of the turbocharger, and a high-pressure exhaust gas recirculation apparatus that is arranged such that EGR gas is removed from the exhaust passage at a location upstream of the turbine of the turbocharger and the removed EGR gas is introduced into the intake passage at a location downstream of the compressor of the turbocharger, and wherein an introduction mode of EGR gas is switched, according to an operating state of the internal combustion engine, among a low pressure mode in which EGR gas is introduced into the intake passage using only the low-pressure exhaust gas recirculation apparatus, a high pressure mode in which EGR gas is introduced into the intake passage using only the high-pressure exhaust gas recirculation apparatus, and a middle mode in which EGR gas is introduced into the intake passage using both the low-pressure exhaust gas recirculation apparatus and the high-pressure exhaust gas recirculation apparatus.

22. The control method according to claim 21, wherein the exhaust gas system further includes an air flowrate detecting device that detects an air flowrate of air that is introduced into the intake passage, and wherein a target air flowrate of air that is introduced into the intake passage is calculated taking into account the amount of fuel supplied by the fuel supply device, the low-pressure exhaust gas recirculation apparatus is operated according to a change rate of the target air flowrate before and after fuel is supplied by the fuel supply device when the introduction mode has been switched to the middle mode, and a gas flowrate of the EGR gas that is introduced by the high-pressure exhaust gas recirculation apparatus is feedback controlled by operating the high-pressure exhaust gas recirculation apparatus such that a difference between the calculated target air flowrate and the detected air flowrate decreases.

23. The control method according to claim 21, further comprising:
calculating a target air flowrate of air that is introduced into the intake passage;
detecting an air flowrate of the air that is introduced into the intake passage;
feedback controlling a gas flowrate of the EGR gas that is introduced by the high-pressure exhaust gas recirculation apparatus, such that a difference between the target air flowrate detected by the target air flowrate and the air flowrate detected by the air flowrate decreases;
prohibiting the feedback control such that the gas flowrate of the EGR gas that is introduced by the high-pressure exhaust gas recirculation apparatus will not decrease when the introduction mode has been switched to the middle mode by the mode switching apparatus and fuel is supplied by the fuel supply device;
calculating the target air flowrate taking into account the amount of fuel that is supplied by the fuel supply device when fuel is supplied by the fuel supply device; and
controlling the EGR rate based on the calculated target air flowrate.

24. The control method according to claim 21, wherein the EGR rate is controlled such that the oxygen concentration of the intake gas that is drawn into the cylinder of the internal combustion engine is constant before and after fuel is supplied by the fuel supply device, on a condition that a predetermined period of time has elapsed after the EGR gas that is introduced by the low-pressure exhaust gas recirculation apparatus has reached the cylinder of the internal combustion engine, after the introduction mode of the EGR gas has been switched from the high pressure mode to the low pressure mode.

25. The exhaust gas system according to claim 4, further comprising:
an oxygen concentration detecting device which is arranged downstream of the exhaust gas control apparatus and detects an oxygen concentration of the exhaust gas,
wherein the exhaust gas recirculation control apparatus includes an air flowrate correcting apparatus that corrects the target air flowrate that is calculated by the target air flowrate calculating apparatus, taking into account the oxygen concentration detected by the oxygen concentration detecting device.

26. The control method according to claim 16, wherein the exhaust gas system further includes an oxygen concentration detecting device which is arranged downstream of the exhaust gas control apparatus and detects an oxygen concentration of the exhaust gas, and wherein the calculated target air flowrate is corrected taking into account the oxygen concentration detected by the oxygen concentration detecting device.

* * * * *